United States Patent
Williams

(10) Patent No.: US 11,259,560 B2
(45) Date of Patent: Mar. 1, 2022

(54) ORBITAL PLANT MATERIAL FEED SYSTEM

(71) Applicant: Altria Client Services LLC, Richmond, VA (US)

(72) Inventor: Dwight David Williams, Powhatan, VA (US)

(73) Assignee: Altria Client Services LLC, Richmond, VA (US)

( * ) Notice: Subject to any disclaimer, the term of this patent is extended or adjusted under 35 U.S.C. 154(b) by 250 days.

(21) Appl. No.: 16/245,673

(22) Filed: Jan. 11, 2019

(65) Prior Publication Data
US 2020/0221756 A1 Jul. 16, 2020

(51) Int. Cl.
*A24C 5/18* (2006.01)
*B65G 47/19* (2006.01)
*A24C 5/39* (2006.01)
*A01F 15/10* (2006.01)

(52) U.S. Cl.
CPC .......... *A24C 5/1807* (2013.01); *A01F 15/10* (2013.01); *A24C 5/1857* (2013.01); *A24C 5/399* (2013.01); *B65G 47/19* (2013.01)

(58) Field of Classification Search
CPC .............................. A01F 15/10; A24C 5/1807
USPC ...................................................... 100/155 R
See application file for complete search history.

(56) References Cited

U.S. PATENT DOCUMENTS

| | | | |
|---|---|---|---|
| 331,676 A * | 12/1885 | Borgfeldt et al. | A24C 1/02 131/44 |
| 1,040,653 A * | 10/1912 | Du Brul | A24C 5/1807 131/66.1 |
| 1,859,965 A | 5/1932 | Gwinn | |
| 2,212,044 A | 8/1940 | Ridley | |
| 2,948,281 A * | 8/1960 | De Voto | A24C 5/3412 131/108 |
| 2,989,055 A | 6/1961 | Labbe | |
| 3,139,972 A * | 7/1964 | Kochalski | A24C 5/18 198/689.1 |
| 3,276,452 A | 10/1966 | Dearsley | |
| 3,307,560 A * | 3/1967 | Meissner | A24C 5/1871 131/84.3 |
| 3,709,274 A | 1/1973 | Marek et al. | |

(Continued)

FOREIGN PATENT DOCUMENTS

| | | | | |
|---|---|---|---|---|
| DE | 456551 C | * | 2/1928 | ........... A24C 5/1807 |
| ES | 2262732 T3 | * | 12/2006 | ............... A24C 5/18 |
| GB | 572526 A | | 10/1945 | |

(Continued)

OTHER PUBLICATIONS

Machine Translation of DE 456651 (Year: 1928).*
Machine Translation of ES 2262732 (Year: 2006).*

*Primary Examiner* — Michael H. Wilson
*Assistant Examiner* — Russell E Sparks
(74) *Attorney, Agent, or Firm* — Harness, Dickey & Pierce, P.L.C.

(57) ABSTRACT

An orbital plant material feed assembly includes a drum structure and hopper assembly. An external surface of the drum structure has a curved shape and includes a peripheral groove. A width of the peripheral groove varies along the external surface of the drum structure. The hopper assembly may define a compression space between the drum structure and a portion of the hopper assembly that covers a portion of the peripheral groove.

34 Claims, 14 Drawing Sheets

(56) References Cited

U.S. PATENT DOCUMENTS 5,669,573 A 9/1997 Hirzel

FOREIGN PATENT DOCUMENTS

| WO | WO-03/030665 A1 | 4/2003 |
| WO | WO-2006/120370 A1 | 11/2006 |

\* cited by examiner

ORBITAL PLANT MATERIAL FEED SYSTEM

BACKGROUND

Field

The present disclosure relates to an orbital plant material feed system and/or a method of manufacturing the same.

Description of Related Art

In manufacturing plant material products (e.g., cigars, cigarettes, other), processes have been used to compress the plant material for further processing. Additional processes and systems are needed.

SUMMARY

At least one example embodiment relates to an orbital plant material feed system and/or a method of manufacturing the same.

According to some example embodiments, an orbital plant material feed assembly may include a drum structure and a hopper assembly. The drum structure may include an external surface having a curved shape. The external surface of the drum structure may include a peripheral groove. A width of the peripheral groove may change from a first value at a first location of the peripheral groove to a second value at a second location of the peripheral groove. The first value may be greater than the second value. The hopper assembly may be configured to cover a coverage area of the external surface of the drum structure. The hopper assembly may be configured to define a compression space between the drum structure and a portion of the hopper assembly that covers a portion of the peripheral groove. The compression space may include an entrance in fluid communication with an inlet opening of the hopper assembly.

In some embodiments, the first location of the peripheral groove and the second location of the peripheral groove may be spaced apart from each other along the external surface of the drum structure.

In some embodiments, the portion of the peripheral groove may be a portion between the first location of the peripheral groove and the second location of the peripheral groove.

In some embodiments, the hopper assembly and the drum structure may be configured to compress plant material feed into the compression space as the plant material traverses from the inlet opening of the hopper assembly to an outlet of the compression space.

In some embodiments, the hopper assembly and the drum structure may be configured to compress plant material fed into the compression space as the drum structure is rotated about an axis of the drum structure.

In some embodiments, the portion of the peripheral groove may be within the coverage area.

In some embodiments, the orbital plant material feed assembly may further include a support structure, a coupling structure connecting the hopper assembly to the support structure, and a drum interface connecting the drum structure to the support structure. The orbital plant material feed assembly may further include a belt connector attached to the support structure, and the drum structure and the hopper assembly may be over the belt connector.

In some embodiments, the drum structure, the hopper assembly, or both the drum structure and the hopper assembly may include steel.

In some embodiments, the drum structure, the hopper assembly, or both the drum structure and the hopper assembly may include steel, poly ether ketone (PEEK), or both steel and PEEK.

In some embodiments, the drum structure may include a first ring structure and a second ring structure. The first ring structure and the second ring structure may be titled towards opposite side of a plane that extends through the first location of the peripheral groove and the second location of the peripheral groove.

In some embodiments, the peripheral groove may include a first sidewall, a second sidewall, and a base surface between the first sidewall and the second sidewall. The peripheral groove may extend at least partially around the circumference of the drum structure.

In some embodiments, the first sidewall of the peripheral groove and the second sidewall of the peripheral groove may be tilted at a first angle and a second angle, respectively, towards a plane that extends through the first location of the peripheral groove and the second location of the peripheral groove.

In some embodiments, the first angle of the peripheral groove and the second angle may each independently be in a range of 3 to 10 degrees.

In some embodiments, the drum structure may include a first ring structure, a second ring structure, and a third ring structure between the first ring structure and the second ring structure. The first ring structure and the second ring structure may be tilted towards opposite sides of the third ring structure. An outer surface of the third ring structure may define the surface of the peripheral groove.

In some embodiments, a first portion of the first ring structure may surround at least part of a first region of the third ring structure, contact the third ring structure, and define the first sidewall of the peripheral groove. The first portion of the second ring structure may surround at least part of a second region of the third ring structure, contact the third ring structure, and define the second sidewall of the peripheral groove.

In some embodiments, the shape of the first ring structure may be the same as the shape of the second ring structure. The first ring structure and the second ring structure may be symmetric to each other with respect to a plane that extends through the first location of the peripheral groove and the second location of the peripheral groove. The first location of the peripheral groove and the second location of the peripheral groove may be about 180 degrees or less apart from each other from a side view of the drum structure.

In some embodiments, the orbital plant material feed assembly may further include a shaft structure coupled to the third ring structure. The shaft structure may be configured to rotate the third ring structure about an axis of the third ring structure.

In some embodiments, the first ring structure and the second ring structure may be connected to the third ring structure such that the first ring structure and the second ring structure may be configured to rotate about the axis of the third ring structure in response to the third ring structure rotating about the axis of the third ring structure.

In some embodiments, the orbital plant material feed assembly may further include pins coupling the third ring structure to the first ring structure and the second ring structure.

In some embodiments, a depth of the peripheral groove may be in range from about 6 mm to about 12 mm at the first location of the peripheral groove and in a range from about 6 mm to about 12 mm at the second location of the peripheral groove. A width of the peripheral groove may be in the range from about 16 mm to about 25.4 mm at the first location the peripheral groove and in a range from about 12 mm to about 6 mm at the second location of the peripheral groove.

In some embodiments, an area of the compression space at the entrance of the compression space may be in a range from about 96 mm sqr to about 304.8 mm sqr. An area of the compression space at the outlet of the compression space may be in a range from about 96 mm sqr to about 144 mm sqr.

In some example embodiments, the hopper assembly may include a hopper structure on a bottom piece. The inlet opening of the hopper assembly may be defined by the hopper structure. The bottom piece of the hopper assembly may be configured to engage and disengage the drum structure to contact and separate from the coverage area of the external surface of the drum structure. The bottom piece of the hopper assembly may define the compression space when in contact with the coverage area.

In some example embodiments, the orbital plant material feed assembly may further include a belt. A part of the belt may further define the compression space between the drum structure and the portion of the hopper assembly that covers the portion of the peripheral groove.

According to some embodiments, a plant material feed system may include the orbital plant material feed assembly described above and may further include one of a conveyor belt, an operations station, a platform, a motor, a vacuum supply pump, a power supply, or a sub combination thereof, or a combination thereof. The conveyor belt may be connected to the orbital plant material feed assembly. The operations station may be used for controlling the orbital plant material feed assembly. The platform may be used for supporting orbital plant material feed assembly. The motor may be used for powering the orbital plant material feed assembly. The vacuum supply pump may be used for providing vacuum to the orbital plant material feed assembly. The power supply may be used for providing power to the orbital plant material feed assembly.

According to some example embodiments, an orbital plant material feed assembly may include a drum structure, a support structure, a drum interface, and a hopper assembly. The drum structure may include a first side, a second side spaced apart from the first side in a first direction, and a middle portion connecting the first side of the drum structure to the second side of the drum structure. An external surface of the middle portion of the drum structure may have a curved surface with a peripheral groove. A width of the peripheral groove may change from a first value at a first location of the peripheral groove to a second value at a second location of the peripheral groove. The first location and the second location may be different from each other. The drum interface may connect the drum structure to the support structure. The drum interface may be configured to rotate the drum structure about an axis that runs in the first direction through the first side of the drum structure and the second side of the drum structure. The hopper assembly may be connected to the support structure. The hopper assembly may be configured to cover the coverage area of the external surface of the middle portion of the drum structure. The hopper assembly may be configured to define a compression space between the drum structure and a portion of the hopper assembly that covers a portion of the peripheral groove between the first location of the peripheral groove and the second location of the peripheral groove. The compression space may include an entrance in fluid communication with an inlet opening of the hopper assembly.

In some embodiments, the hopper assembly and the drum structure may be configured to compress plant material fed into the compression space as the plant material traverses from inlet opening of the hopper assembly to an outlet of the compression space. The hopper assembly and the structure may be configured to compress plant material fed into the compression spaced as the drum structure is rotated about the axis of the drum structure.

In some embodiments, the peripheral groove in the external surface of the middle portion of the drum structure may include a first sidewall, a second sidewall opposite the first sidewall, and a base surface between the first sidewall of the peripheral groove and the second sidewall of the peripheral groove. The first sidewall of the peripheral groove and the second sidewall of the peripheral groove may be tilted at a first angle and a second angle, respectively, towards a plane that extends through the first location of the peripheral groove and the second location of the peripheral groove. The peripheral groove may extend at least partially around a circumference of the middle portion of the drum structure.

In some embodiments, the first angle of the peripheral groove and the second angle of the peripheral groove may each independently be in a range of 3 to 10 degrees.

In some embodiments, the drum structure may include a first ring structure, a second ring structure spaced apart from the first ring structure in a first direction, and a third ring structure between the first ring structure in the second ring structure. The third ring structure may be the middle portion of the drum structure. A first portion of the first ring structure may surround a first region of the third ring structure, contact the third ring structure, and define the first sidewall of the peripheral groove. A first portion of the second ring structure may surround a second region of the third ring structure, contact the third ring structure, and define the second sidewall of the peripheral groove. The first ring structure and the second ring structure may be tilted towards opposite sides of the third ring structure. An outer surface of the third ring structure may define the base surface of the peripheral groove.

In some embodiments, the first location of the peripheral groove may be a first position of the drum structure from a side view of the drum structure. The second location of the peripheral groove may be a second position of the drum structure from the side view of the drum structure. The first location of the drum structure and the second location of the drum structure may be about 180 degrees or less apart from each other from the side view of the drum structure. The width of the peripheral groove may decrease around the external surface of the middle portion of the drum structure from the first location of the peripheral groove to the second location of the peripheral groove.

In some embodiments, the drum interface may include a shaft structure that extends in the first direction through the first side of the drum structure and the second side of the drum structure. The shaft structure may be coupled to the middle portion of the drum structure.

According to some example embodiments, a method of manufacturing an orbital plant material feed assembly may include connecting a drum structure to a support structure using a drum interface and connecting a hopper assembly to the support structure. The drum structure may include a first side, a second side spaced apart from the first side in a first direction, and a middle portion connecting the first side of the drum structure to the second side of the drum structure. An external surface of the middle portion of the drum structure may have a curved surface with the peripheral groove. A width of the peripheral groove may change from a first value at a first location of the peripheral groove to a second value at a second location of the peripheral groove. The first location and the second location may be different from each other. The drum interface may be configured to rotate the drum structure about an axis of that runs in the first direction to through the first side of the drum structure and the second side drum structure. The hopper assembly may be configured to cover a coverage area of the external surface of the middle portion of the drum structure. The hopper simply may be configured to define a compression space between the drum structure and a portion of the hopper assembly that covers a portion of the peripheral groove between the first location of the peripheral groove and the second location of the peripheral groove. The compression space may include an entrance in fluid communication with an inlet opening of the hopper assembly.

In some embodiments, the first location of the peripheral groove may be a first position of the drum structure from a side view. The second location of the peripheral groove may be a second position of the drum structure from the side view. The first location of the drum structure and the second location of the drum structure may be about 180 degrees apart from each other from a side view of the drum structure. The width of the peripheral groove may decrease around the external surface of the middle portion of the drum structure from the first location of the peripheral groove to the second location of the peripheral groove.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
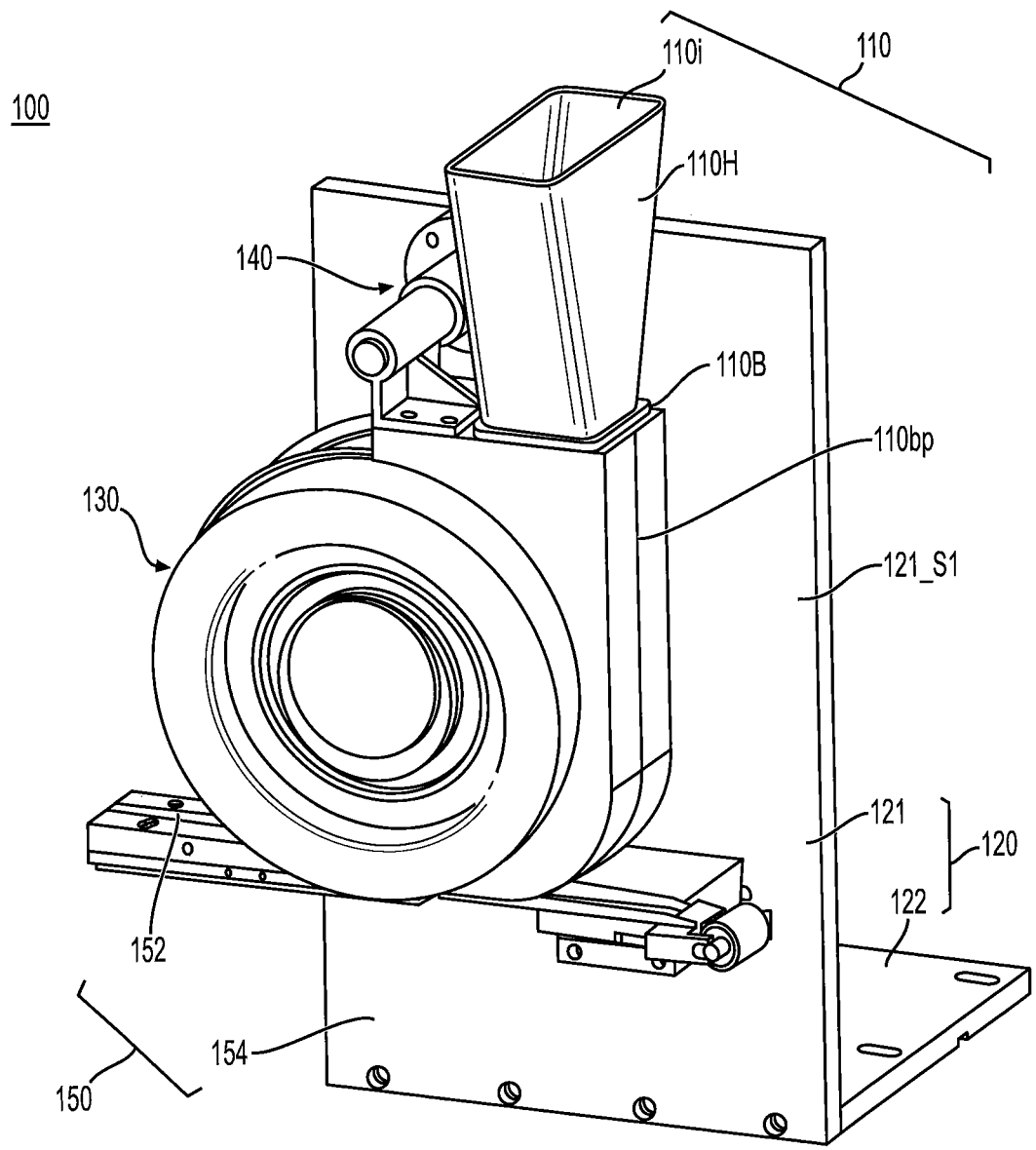
FIG. 1 is a perspective view of an orbital plant material feed assembly according to some example embodiments.
Figure 1:
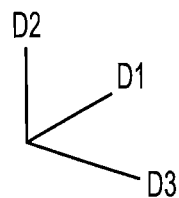

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations and variations in shapes. When the terms "about" or "substantially" are used in this specification in connection with a numerical value, it is intended that the associated numerical value include a tolerance of ±10% around the stated numerical value unless the context indicates otherwise.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2A:
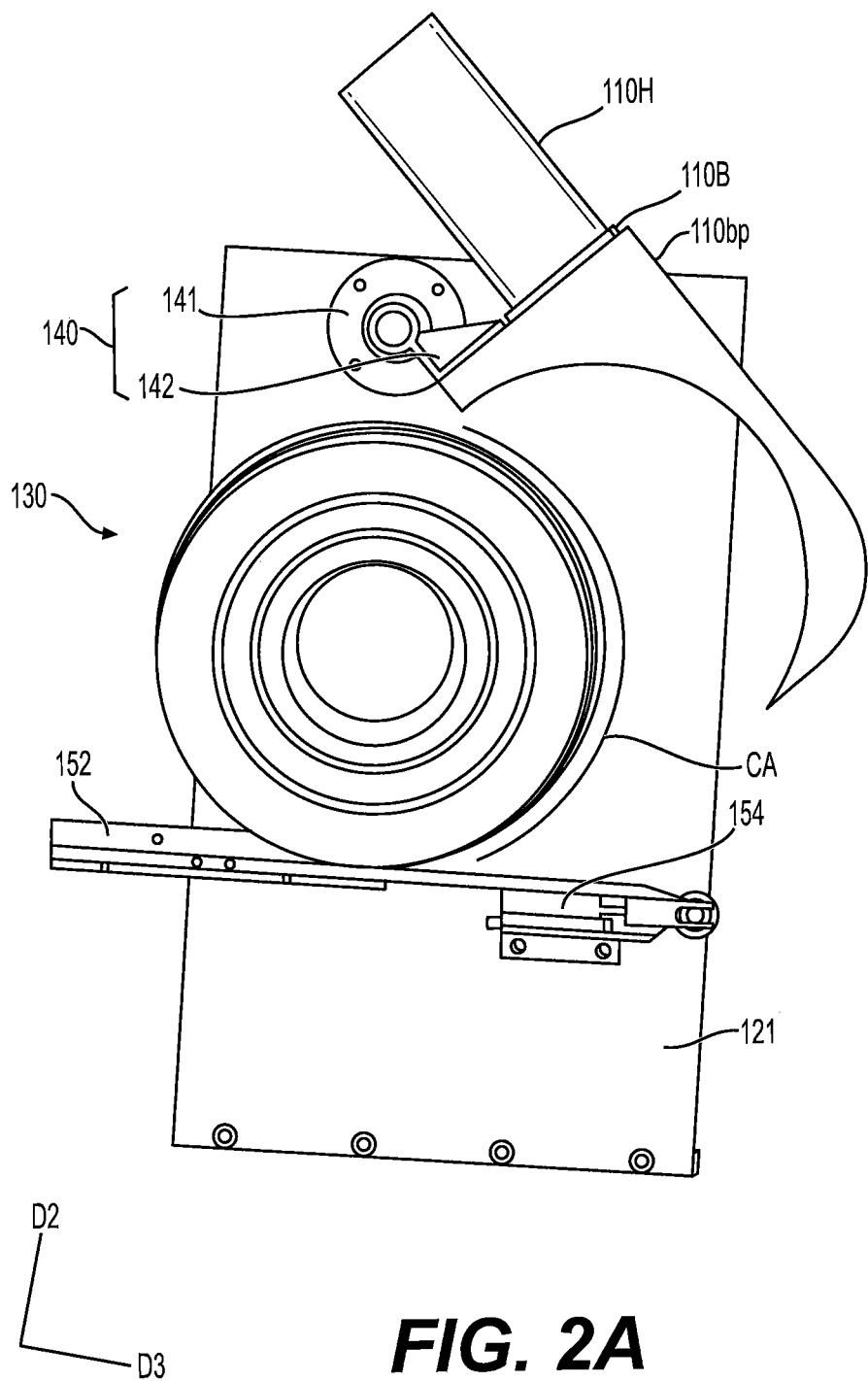
FIGS. 2A and 2B are side views of the orbital plant material feed assembly in FIG. 1.
Figure 2B:
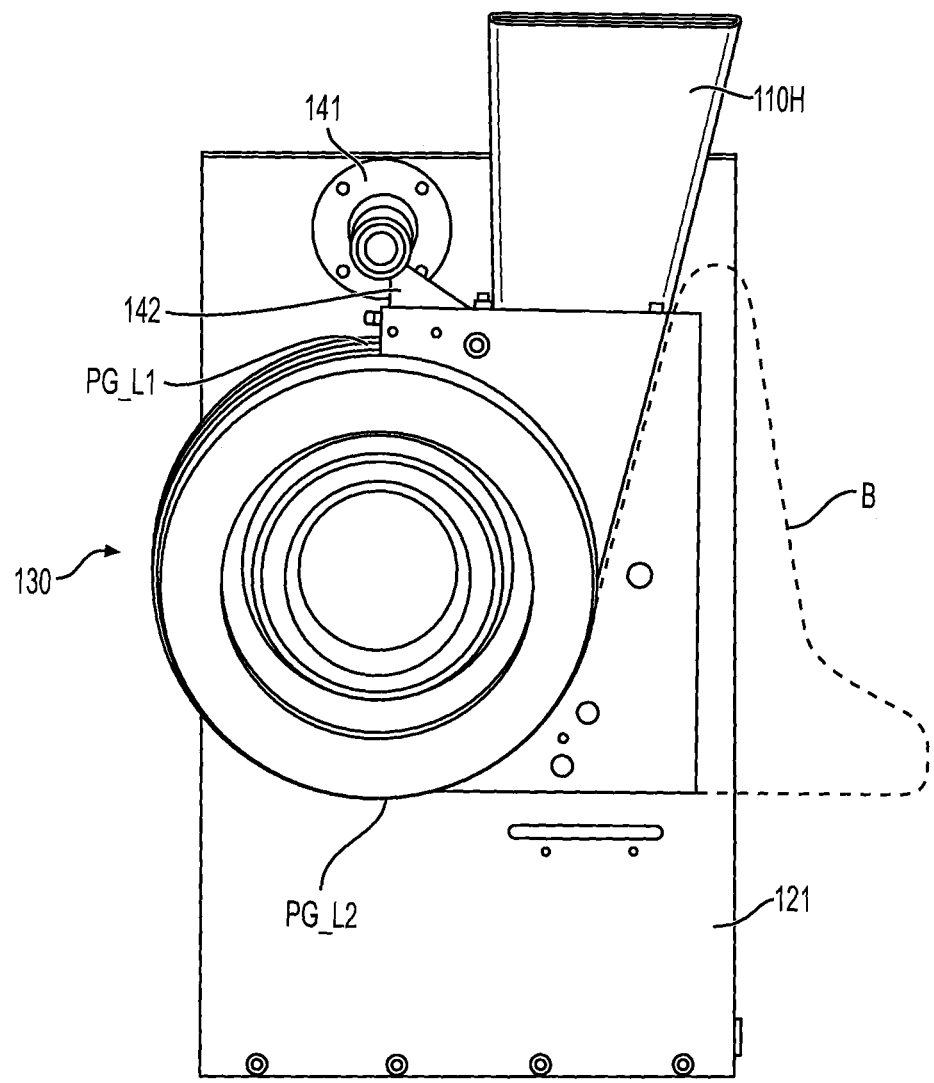
Figure 2C:
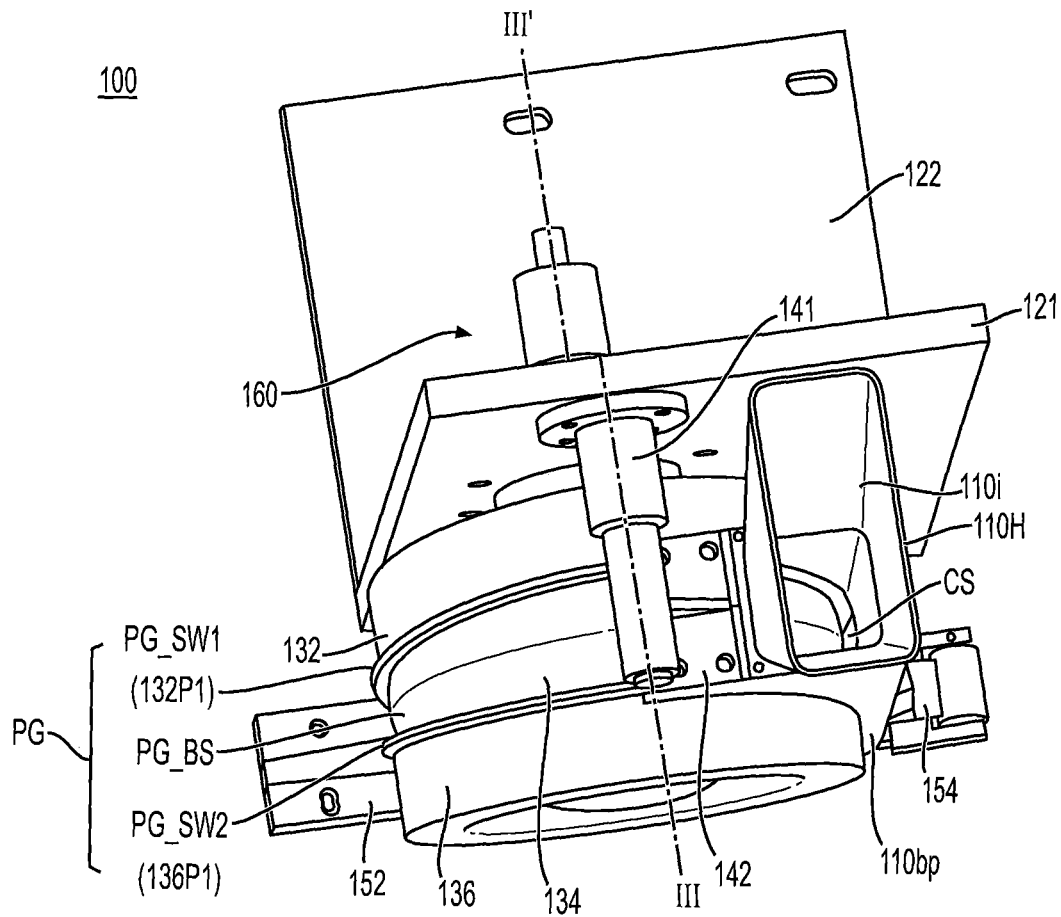
FIG. 2C is an overhead view of the orbital plant material feed assembly in FIG. 1.

FIG. 1 is a perspective view of an orbital plant material feed assembly according to some example embodiments. FIGS. 2A and 2B are side views of the orbital plant material feed assembly in FIG. 1. FIG. 2C is an overhead view of the orbital plant material feed assembly in FIG. 1.

Referring to FIG. 1, according to some example embodiments, an orbital plant material feed assembly 100 may include a hopper assembly 110, a support structure 120, a drum structure 130, a coupling structure 140, and a belt connector 150 attached to the support structure 120. The coupling structure 140 may connect the hopper assembly 110 to the support structure 120. A drum interface, described later in FIGS. 3A to 3C, may connect the drum structure 130 to the support structure 120. The drum structure 130 and the hopper assembly 110 may be disposed over the belt connector 150.

The hopper assembly 110, the drum structure 130, support structure 120, drum interface (described later), and/or belt connector 150 may include one or more parts formed of steel, a polymer material such as poly ether ketone (PEEK), and/or other suitable materials. However, example embodiments are not limited thereto.

The hopper assembly 110 may include a bottom piece 110*bp* and a hopper structure 110H on the bottom piece 110*bp*. The hopper structure 110H may include a base 110B. The base 110B may have a flat shape and may include holes for inserting fasteners (e.g., bolts or screws) to secure the hopper structure 110H to the bottom piece 110*bp*. The support structure 120 may include a support base 122 connected to a support wall 121. A first surface 121_S1 of the support wall 121 may face the drum structure 130 and may be spaced apart from the drum structure in a first direction D1. A height of the support wall 121 may extend in a second direction D2 that crosses the first direction D1. A width of the support wall 121 and the support base 122 may extend in a third direction D3 that crosses the first and second directions D1 and D2. A second surface 121_S2 (see FIG. 4B) of the support wall 121 may be connected to the support base 122. For example, an edge of the support base 122 may connect to a bottom region of the support wall 121. An external surface of the drum structure 130 may have a curved shape and may include a peripheral groove PG (see FIG. 2C). The belt connector 150 may include a rail portion 152 and a mounter 154. The rail portion 152 may extend in the third direction D3. The mounter 154 may attach the rail portion 152 to the first surface 121_S1 of the support wall 121.

Referring to FIGS. 2A and 2B, the coupling structure 140 may include a coupling flange 141 and a coupling bracket 142. The coupling flange 141 may be attached to the first surface 121_S1 of the support wall 121. The coupling bracket 142 may connect the hopper assembly 110 to the coupling flange 141. In an example embodiment, the coupling bracket 142 may connect the bottom piece 110*bp* of the hopper assembly 110 to the coupling flange 141. The bottom piece 110*bp* may be configured to engage and disengage the drum structure 130, based on rotating a tubular section (see tubular section 142*t* in FIG. 4A) of the coupling bracket 142 around the second rod portion (see second rod portion 141P2 in FIGS. 4A and 4B below) of the coupling flange 141, to contact and separate from a coverage area CA of the external surface of the drum structure 130.

The hopper assembly 110, for example the bottom piece 110*bp*, may be configured to cover a coverage area CA of the external surface of the drum structure 130. The bottom piece 110*bp* of the hopper assembly may engage one or more locations of the peripheral groove PG, including for example, a first location PG_L1 and a second location PG_L2 of the peripheral groove PG. The first location PG_L1 and the second location PG_L2 of the peripheral groove PG may be spaced apart from each other by about 180 degrees or less (e.g., greater than or equal to about 90 degrees and less than about 180 degrees), from a side view of the drum structure 130, along the external surface of the drum structure 130. However, example embodiments are not limited thereto and, in some embodiments, the first location PG_L1 and the second location PG_L2 of the peripheral groove PG may be spaced apart from each other by an angle that is greater than about 180 degrees.

In some example embodiments, the orbital plant material feed assembly may further include a belt B positioned near a side of the drum structure 130, as shown in FIG. 2B. In other embodiments, the belt B may be omitted from the orbital plant material feed assembly 100. If the belt B is included, then the belt B may be configured to move in a counterclockwise direction as the drum structure 130 rotates in a clockwise direction. Also, a part of the belt B between the drum structure 130 and the bottom piece 110*bp* may limit and/or reduce plant material provided in the hopper assembly 110 from sticking to stationary surfaces of the hopper assembly 110, such as the wall of the bottom piece 110*bp*.

Referring to FIGS. 1 and 2A to 2C, the hopper assembly 110 may be configured to define a compression space CS between the drum structure 130 and a portion of the hopper assembly 110, such as the bottom piece 110*bp*, that covers a portion of the peripheral groove PG between the first location PG_L1 and the second location PG_L2 of the peripheral groove PG. The compression space CS may include an entrance in fluid communication with an inlet opening 110*i* of the hopper assembly 110. The inlet opening 110*i* of the hopper assembly 110 may be defined by the hopper structure 110H and may extend through a height of the hopper structure 110H and through the base 110B of the hopper structure 110H.

The peripheral groove PG in the external surface of the drum structure 130 may include (and/or be defined by) a first sidewall PG_SW1, a second sidewall PG_SW2 opposite the first sidewall PG_SW1, and a base surface PG_BS between the first sidewall PG_SW1 of the peripheral groove PG and the second sidewall PG_SW1 of the peripheral groove PG. The width of the peripheral groove PG may decrease along the external surface of the drum structure 130 from the first location PG_L1 (see FIG. 2B) to the second location PG_L2 (see FIG. 2B) of the drum structure 130. In an example embodiment, the width of the peripheral groove PG may be defined by the distance between the first sidewall PG_SW1 and the second sidewall PG_SW2, and in some example embodiments this distance may decrease from the first location PG_L1 to the second location PG_L2. In some embodiments, the drum structure 130 may have a cylindrical shape with tilted sides and the peripheral groove PG may extends at least partially around a circumference of the drum structure 130. The peripheral groove PG may extend along the external surface of a middle portion of the drum structure 130.

The drum structure 130 may include a first ring structure 132, a second ring structure 136 spaced apart from the first ring structure 132 in a first direction D1, and a third ring structure 134 between the first ring structure 132 and the second ring structure 136. The third ring structure 134 may be referred to as a middle portion of the drum structure 130.

The hopper assembly 110 and the drum structure 130 may be configured to compress plant material fed into the compression space CS as the plant material traverses from the inlet opening 110i of the hopper assembly 110 to an outlet of the compression space CS and as the drum structure 130 is rotated about an axis of the drum structure 130 that runs in the first direction D1 through a length L of the drum structure 130.

An orbital plant material feed assembly 100 may be used in a dynamic process that compresses plant material fed into the inlet opening 110i of the hopper assembly 110. As the plant material traverses from the inlet opening 110i of the hopper assembly to an outlet of the compression space CS, the area of the compression space CS decreases, including in some example embodiments at least because the width of the peripheral groove PG is wider at the first location PG_L1 than the second location PG_L2. In some embodiments, the area of the compression space CS may also decrease because the gap between the external surface of the drum structure 130 and the internal surface of the bottom piece 110bp may decrease in the third direction D3 as the plant material traverses from the inlet opening 110i of the hopper assembly to an outlet of the compression space CS. Also, in some embodiments, if the belt B in FIG. 2B is included, a part of the belt B between the coverage area CA of the drum structure 130 and the bottom piece 110bp may further define the compression space CS. As the plant material traverses from the inlet opening 110i of the hopper assembly to an outlet of the compression space CS, the drum structure 130 may be rotated in a clockwise direction and the belt B may move in a counterclockwise structure and may further push plant material into the peripheral groove PG. The plant material may exit the outlet of the compression space CS as a continuous structure with a cross-section that corresponds to the outlet of the compression space CS.

In an example embodiment, an orbital plant material feed assembly 100 may be continuously operated for a desired duration. In an example embodiment, the throughput of an orbital plant material feed assembly continuously operated may be higher than a conventional non-continuous process for compressing plant material. In an example embodiment of an orbital plant material feed assembly, the plant material may be pressed against the first sidewall PG_SW1 and second sidewall PG_SW2 of the peripheral groove PG, the base surface PG_BS of the peripheral groove PG, and the bottom piece 110bp. Plant material may be compressed in the first direction D1 between the first sidewall PG_SW1 and the second sidewall PG_SW2 of the peripheral groove PG, and may also be compressed in the third direction D3 between the base surface PG_BS of the peripheral groove PG and at least an inner wall of the bottom piece 110bp. Also, if the belt B is included, plant material may also be compressed in the third direction D3 when the belt B pushes plant material into the peripheral groove PG. In an example embodiment, the weight distribution (e.g., density) of the compressed plant material may be more uniform and the run-to-run process variation may be reduced using an orbital plant material feed assembly of an example embodiment compared to a conventional process for compressing plant material. In an example embodiment, the yield of the compressed plant material may be improved In an example embodiment, one or more parts of an orbital plant material feed assembly 100 in the compression space CS that are exposed to the plant material may be formed of steel, a polymer material such as poly ether ketone (PEEK), and/or other suitable materials. In an example embodiment, drum structure 130 may be rotated as the plant material traverses from the inlet opening 110i of the hopper assembly 110 to the outlet of the compression space CS.

Figure 3A:
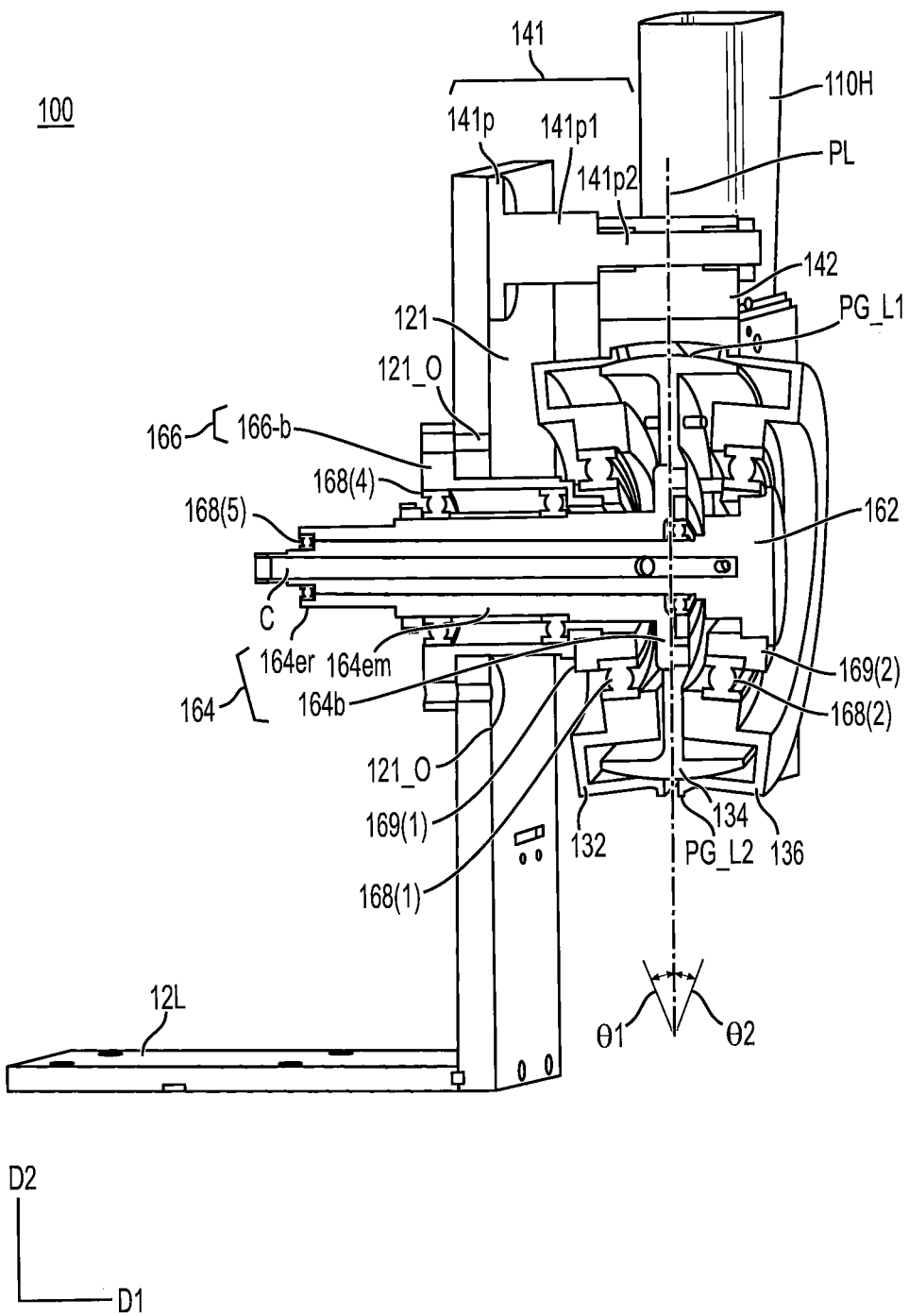
FIG. 3A is a cross-sectional view of the orbital plant material feed assembly, taken along line III-III' of FIG. 2C.
Figure 3B:
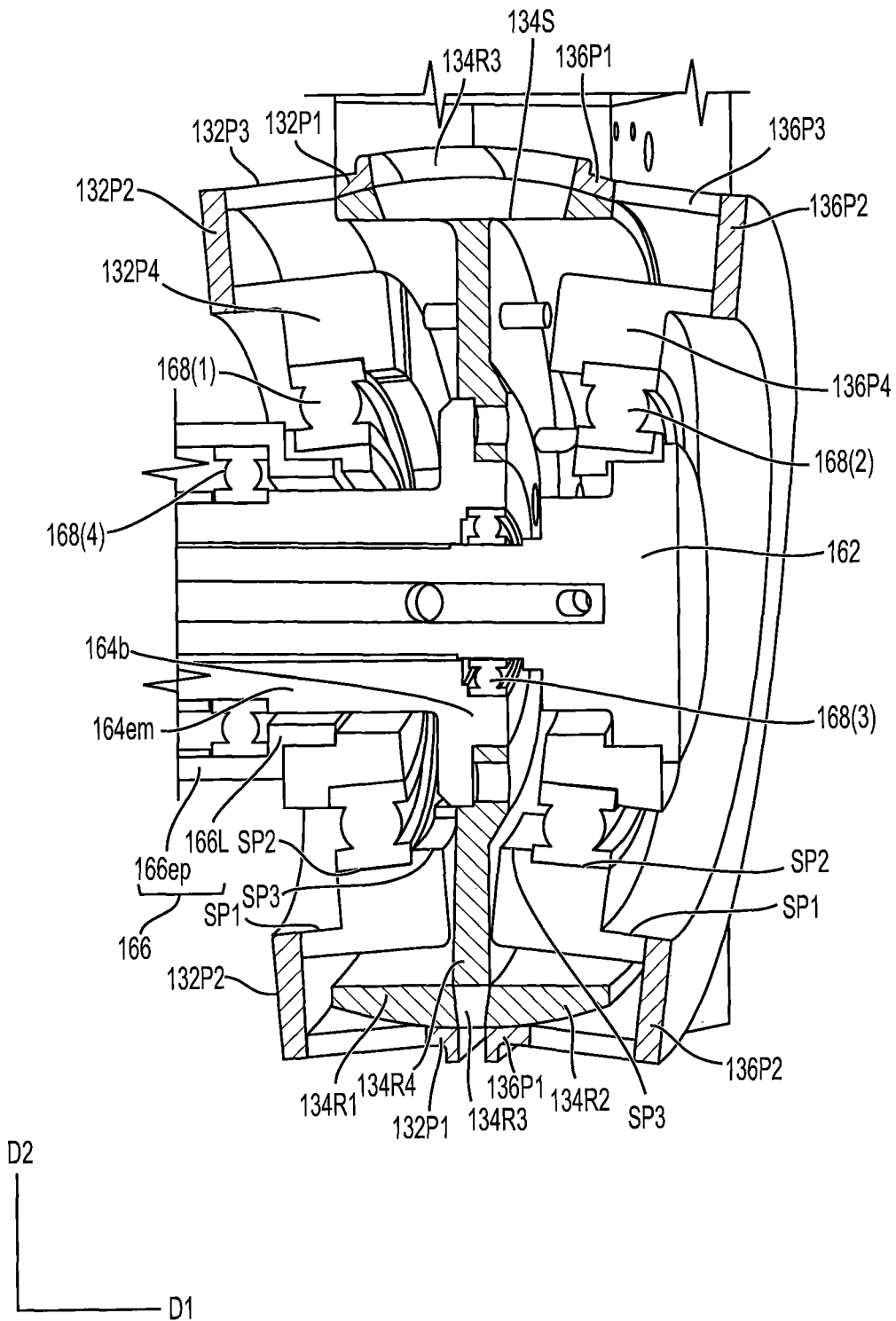
FIGS. 3B and 3C are enlarged views of the area A in FIG. 3A.
Figure 3C:
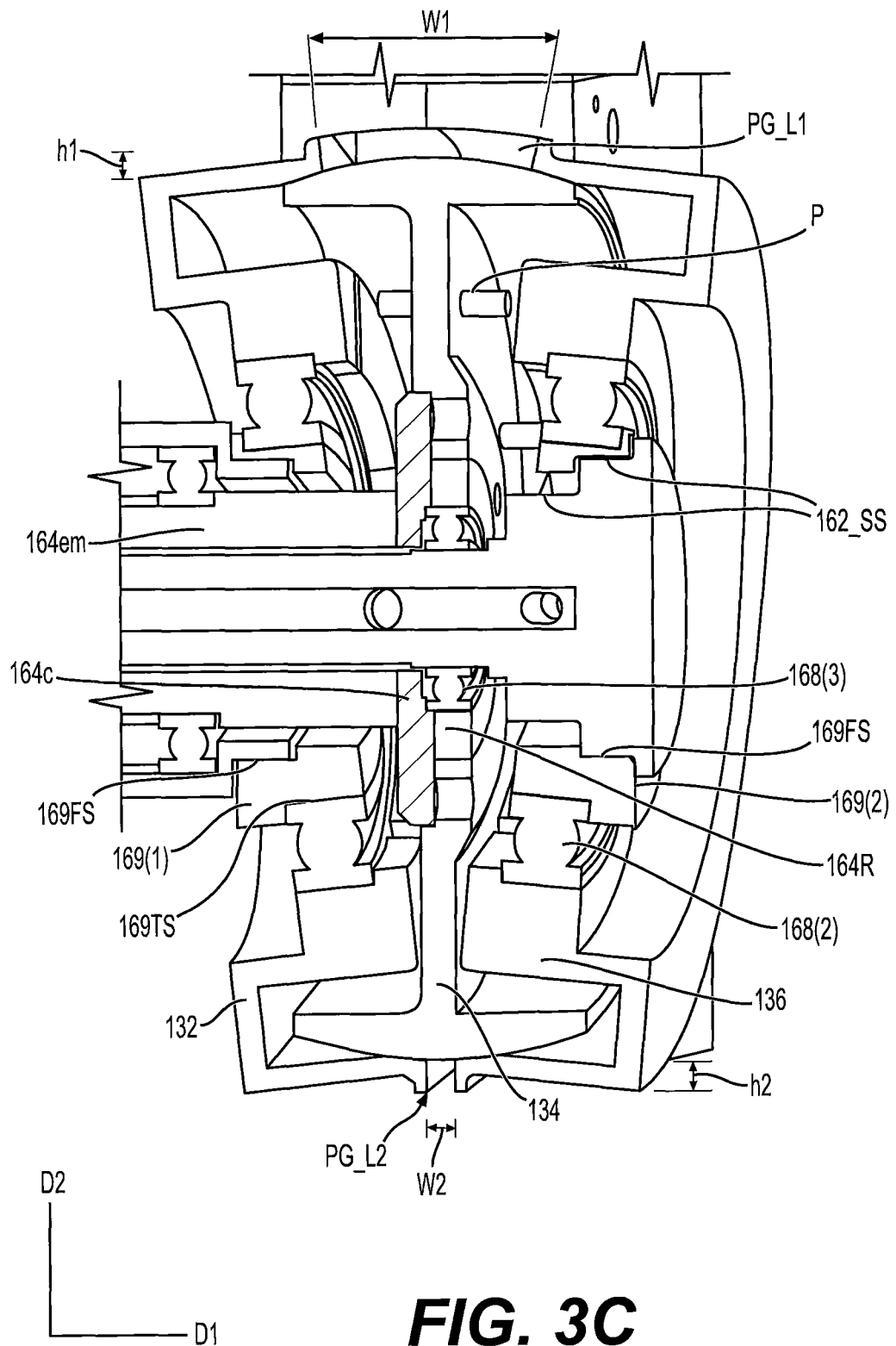
Figure 3D:
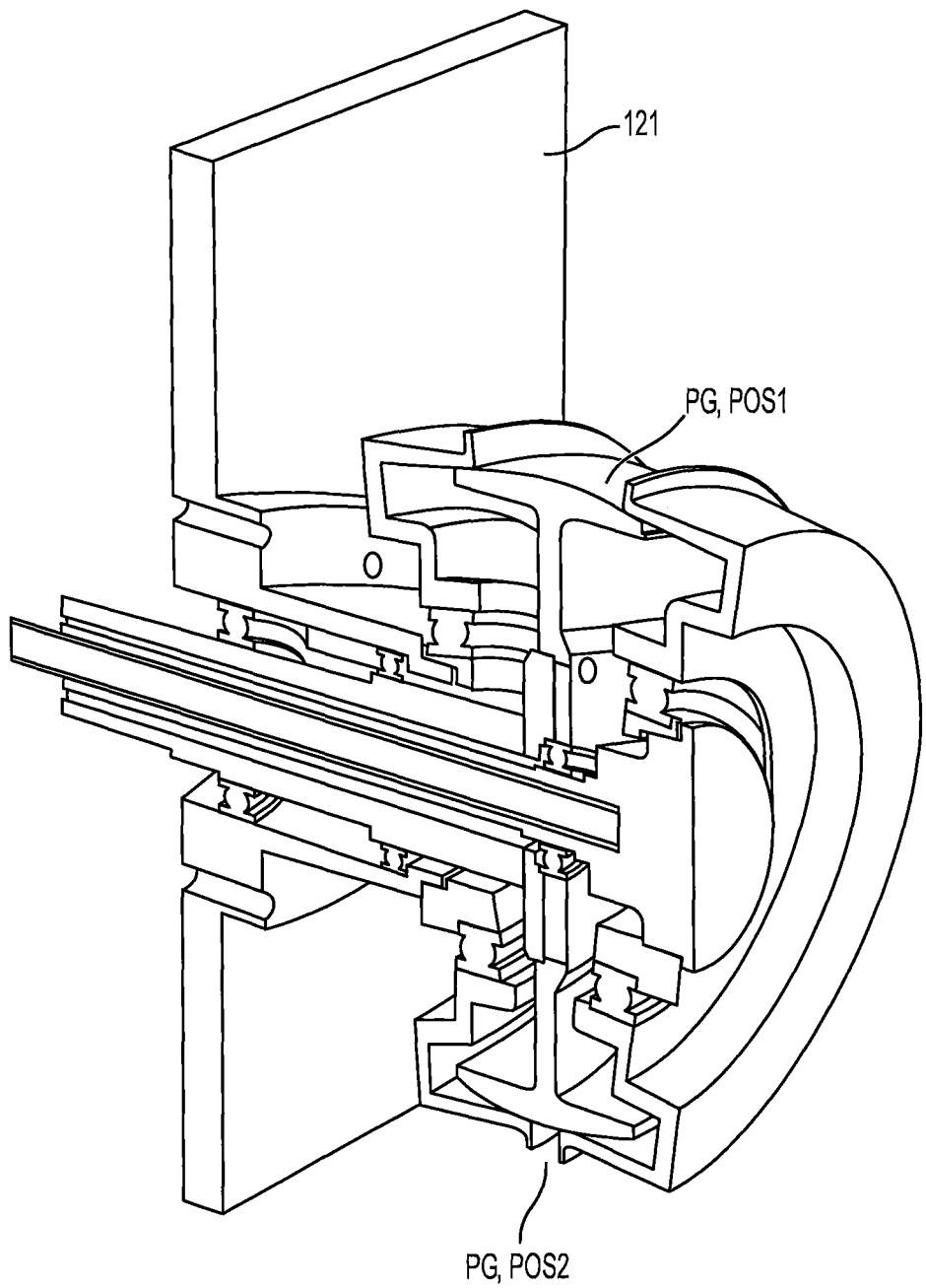
FIG. 3D is a perspective view of a cross-section of the orbital plant material feed assembly, taken along line III-III' of FIG. 2C without the hopper assembly included.

FIG. 3A is a cross-sectional view of the orbital plant material feed assembly, taken along line III-III' of FIG. 2C. FIGS. 3B and 3C are enlarged views of the area A in FIG. 3A. FIG. 3D is a perspective view of a cross-section of the orbital plant material feed assembly, taken along line III-III' of FIG. 2C without the hopper assembly included.

Referring to FIGS. 2C and 3A, the first sidewall of the peripheral groove PG_SW1 and the second sidewall of the peripheral groove PG_SW2 may be tilted at a first angle θ1 and a second angle θ2, respectively, towards a plane PL that extends in the second direction D2 through the first location PG_L1 of and the second location PG_L2 of the peripheral groove PG. The first angle θ1 and the second angle θ2 may each independently be in a range of 3 to 10 degrees. In an example embodiment, the first angle θ1 and the second angle θ2 may be the same number of degrees. In an example embodiment, the first angle θ1 and the second angle θ2 may be a different number of degrees. The first ring structure 132 and the second ring structure 136 may be symmetric to each other with respect to the plane PL that extends through the first location PG_L1 and second location PG_L2 of the peripheral groove PG. A shape of the first ring structure 132 may be the same as a shape of the second ring structure 136. However, example embodiments are not limited thereto and the first and second ring structures 132 and 136 may alternatively be different shapes.

Referring to FIG. 3B, the first ring structure 132 may include a first portion 132P1, a second portion 132P2, a third portion 132P3, and a fourth portion 132P4. The second ring structure 136 may include a first portion 136P1, a second portion 136P2, a third portion 136P3, and a fourth portion 136P4. The third ring structure 134 may include a first region 134R1, a second region 134R2, a third region 134R3, and a fourth region 134R4.

The first portion 132P1 of the first ring structure 132 may surround at least part of the first region 134R1 of the third ring structure 134 and may contact the third ring structure 134. The first sidewall PG_SW1 of the peripheral groove PG may be defined by the first portion 132P1 of the first ring structure 132. The first portion 136P1 of the second ring structure 136 may surround at least part of the second region 134R2 of the third ring structure 134 and may contact the third ring structure 134. The second sidewall PG_SW2 of the peripheral groove PG may be defined by the first portion 136P1 of the second ring structure 136. The first ring structure 132 and the second ring structure 136 may be tilted towards opposite sides of the third ring structure 134. An outer surface of the third ring structure 134, such as an outer surface of the third region 134R3, may define the base surface PG_BS of the peripheral groove PG (see FIG. 2C).

The third region 134R3 of the third ring structure 134 may be between the first region 134R1 and the second region 134R2 of the third ring structure 134. The third region 134R3 may surround a fourth region 134R4 of the third ring structure 134. The first region to the third regions 134R1 to 134R3 may define a peripheral portion of the third ring structure 134. A width of the peripheral portion of the third ring structure in the first direction D1 may be greater than a width of the fourth region 134R4 of the third ring structure 134 in the first direction D1. A thickness 134T1 of the peripheral portion 134R1 to 134R3 of the third ring structure 134 in the second direction D2 may vary such that an outer surface of the peripheral portion 134R1 to 134R3 of the third ring structure 134 is curved (e.g., convex in an example embodiment, but not limited thereto).

The second portion 132P2 of the first ring structure 132 and the second portion 136P2 of the second ring structure 136, respectively, may define outer edges of the first ring structure 132 and the second ring structure 136. The third portion 132P3 may connect the first portion 132P1 of the first ring structure 132 to the second portion 132P2 of the first ring structure 132. The third portion 136P3 of the second ring structure 136 may connect the first portion 136P1 of the second ring structure 136 to the second portion 136P2 of the second ring structure 136. A cross-section of the fourth portion 132P4 of the first ring structure 132 and a cross-section of the fourth portion 136P4 of the second ring structure 136 may each have a stepwise shape including a plurality of steps. The third portion 132P3 of the first ring structure 132 may surround at least part of the fourth portion 132P4 of the first ring structure 132. The third portion 136P3 of the second ring structure 136 may surround at least part of the fourth portion 136P4 of the second ring structure 136.

Referring to FIG. 3C, a width of the peripheral groove PG may change from a first value W1 (first width) at a first location of the peripheral groove PG_L1 to a second value W2 (second width) at a second location of the peripheral groove PG_L2. The first value W1 may be greater than the second value W2.

In some example embodiments, a depth (or height) h1 of the peripheral groove PG may be in a range from 6 mm to 12 mm at the first location PG_L1 of the peripheral groove PG and a depth (or height) h2 of the peripheral groove PG may be in a range from 6 mm to 12 mm at the second location PG_L2 of the peripheral groove PG. Other dimensions may be used in other example embodiments, including, for example, a depth (or height) h1 smaller than 6 mm or greater than 12 mm, and a depth (or height) h2 smaller than 6 mm or greater than 12 mm. In some example embodiments, a width w1 of the peripheral groove PG may be in a range from 16 mm to 25.4 mm at the first location PG_L1 of the peripheral groove PG and a width w2 of the peripheral groove PG may be in a range from 6 mm to 12 mm at the second location PG_L2 of the peripheral groove PG. Other dimensions may be used in other example embodiments, including, for example, a width w1 that is less than 16 mm or greater than 25.4 mm, and a width w2 that is smaller than 6 mm or greater than 12 mm.

In some example embodiments, an area of the compression space CS at the entrance of the compression space CS may be in a range from 96 mm sqr to 304.8 mm sqr. Other dimensions may be used in other example embodiments, including, for example, areas of a compression space CS at the entrance of the compression space CS smaller than 96 mm sqr or greater than 304.8 mm sqr. The area at the entrance of the compression space CS may correspond to an area of the inlet opening 110i at a bottom region of the hopper structure 110H. In some example embodiments, an area of the compression space CS at the outlet of the compression space CS, for example adjacent to the second location PG_L2 of the peripheral groove PG, may be in a range from 36 mm sqr to 144 mm sqr. Other dimensions may be used in other example embodiments, including, for example, areas of a compression space CS at the outlet of the compression space CS smaller than 36 mm sqr or greater than 144 mm sqr.

In an example embodiment, the compression space CS at the outlet of the compression space may be about 8 mm-wide and 8 mm-deep, and may have an area of about 64 mm sqr, but example embodiments are not limited thereto.

Referring to FIGS. 3A to 3C, an orbital plant material feed assembly 100 may include a drum interface connecting the drum structure 130 to the support wall 121. The drum interface may include a shaft structure 162, a first flange 164, a second flange 166, spacer structure 168, and gasket rings 169, but is not limited thereto. The shaft structure 162 may be coupled to the third ring structure 134. The shaft structure 162 may be configured to rotate the third ring structure 134 about an axis of the drum structure 130 (e.g., axis of the third ring structure 134). The shaft structure 162 may extend in the first direction D1 through a first side of the drum structure 130 to a second side of drum structure 130, where the first ring structure 132 and the second ring structure 136 may define the first side and the second side of the drum structure 130, respectively.

The first ring structure 132 and the second ring structure 136 may be connected to the third ring structure 134, for example through pins P, such that the first ring structure 132 and the second ring structure 136 may be configured to rotate about the axis of the drum structure 130 in response to the third ring structure 134 rotating about the axis of the drum structure 130. As shown in FIG. 3C, the pins P may couple the first ring structure 132 and the second ring structure 136, respectively, to the third ring structure 134.

In an example embodiment, a first position POS1 and a second position POS2 of the drum structure 130 may about 180 degrees apart from each other from a side view of the drum structure 130. Other dimensions may be used in other example embodiments, for example, a first position POS1 and a second position POS2 may be less than 180 degrees apart or greater than 180 degrees apart. A distance in the first direction D1 between the first portion 132P1 of the first ring structure 132 and the first portion 136P1 of the second ring structure 136 reduces in a circumferential direction of the drum structure 130 from the first position POS1 of the drum structure 130 to the second position POS2 of the drum structure 130.

According to various example embodiments, a distance in the first direction D1 between the second portion 132P2 of the first ring structure 132 and the second portion 136P2 of the second ring structure 136 may reduce in the circumferential direction of the drum structure 130 from the first position POS1 of the drum structure 130 to the second position POS2 of the drum structure 130, a distance in the first direction D1 between the third portion 132P3 of the first ring structure 132 and the third portion 136P3 of the second ring structure 136 may reduce in the circumferential direction of the drum structure 130 from the first position POS1 of the drum structure 130 to the second position POS2 of the drum structure 130, and/or a distance in the first direction D1 between the fourth portion 132P4 of the first ring structure 132 and the fourth portion 136P4 of the second ring structure 136 may reduce in the circumferential direction of the drum structure 130 from the first position POS1 of the drum structure 130 to the second position POS2 of the drum structure 130 from the side view.

Figure 4A:
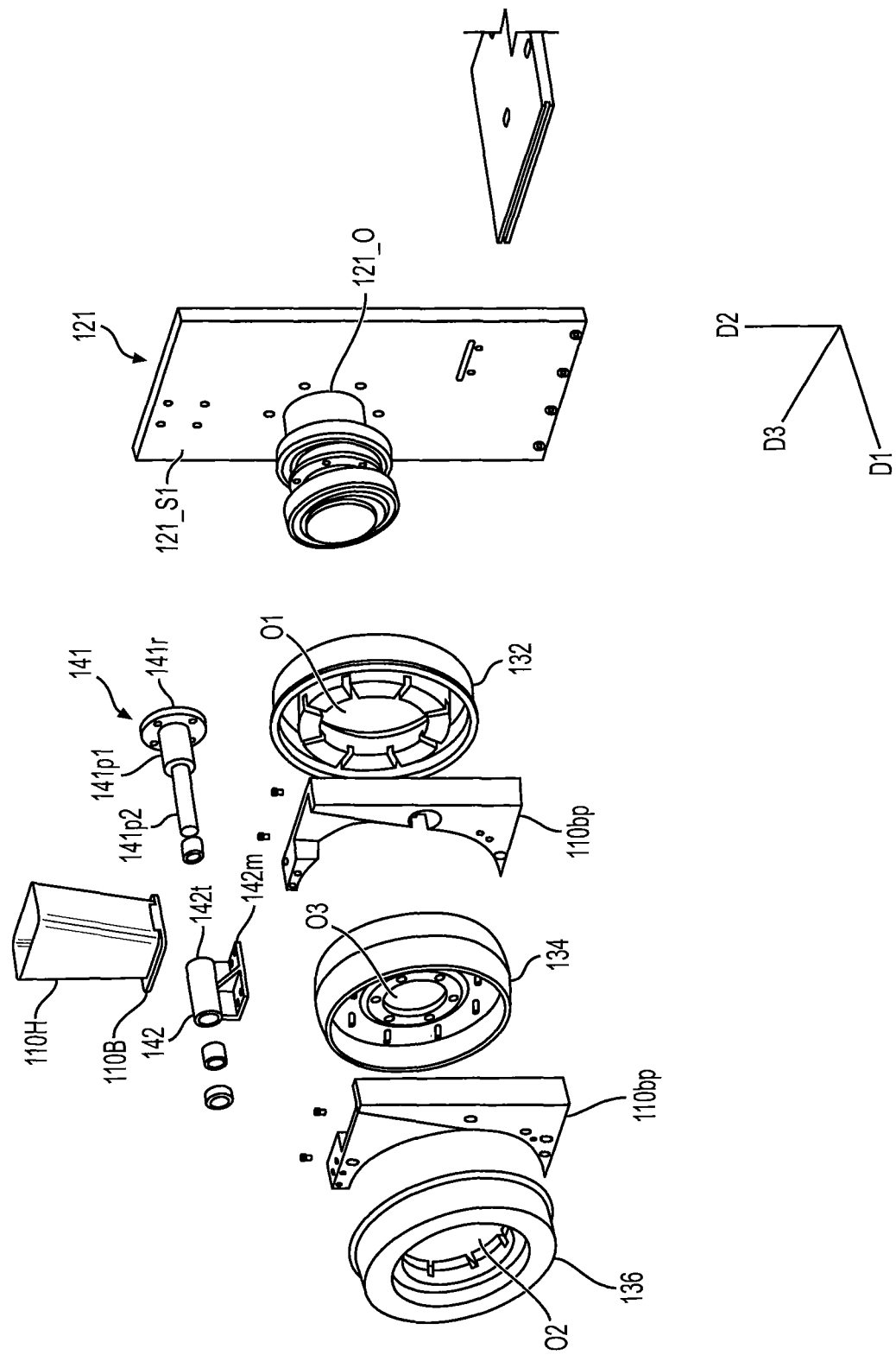
FIGS. 4A, 4B, and 4C are exploded views of a plant material feed assembly according to some example embodiments.
Figure 4B:
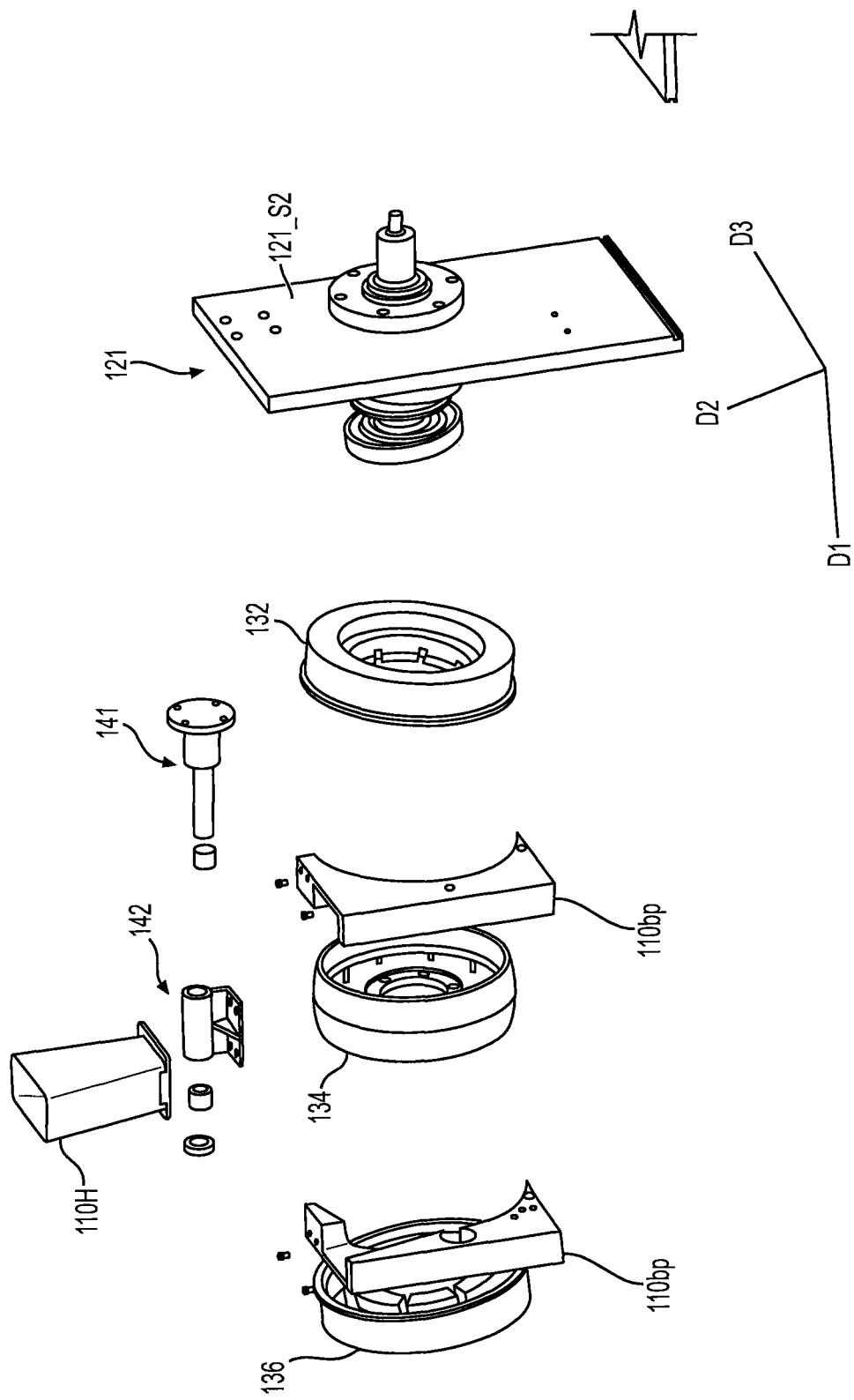
Figure 4C:
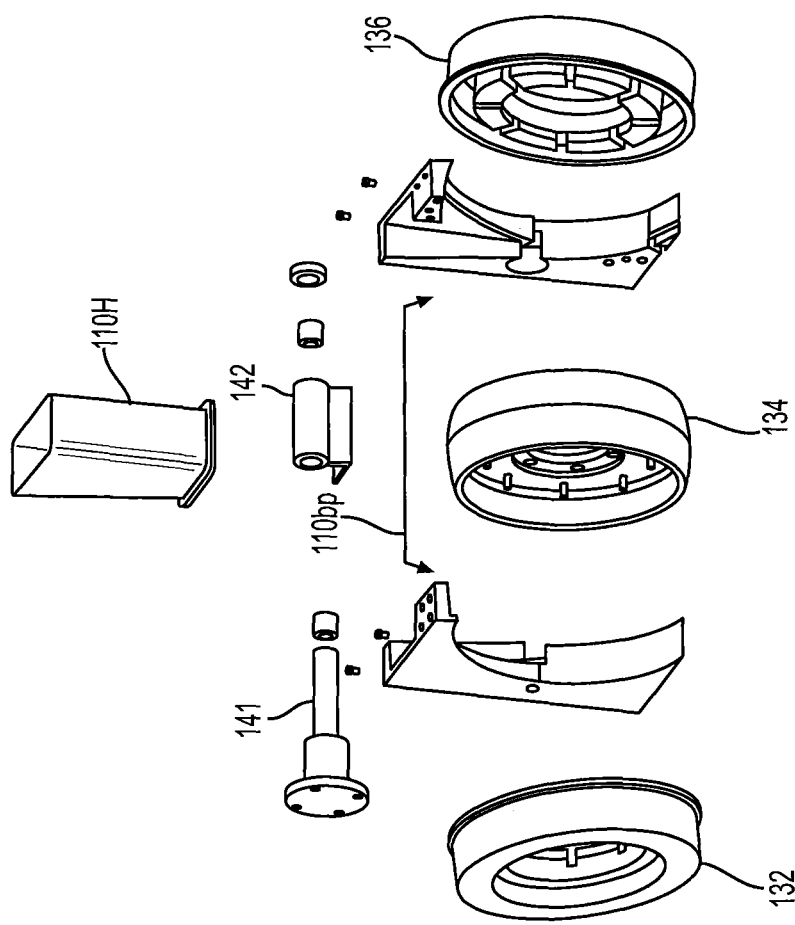
Figure 4C:
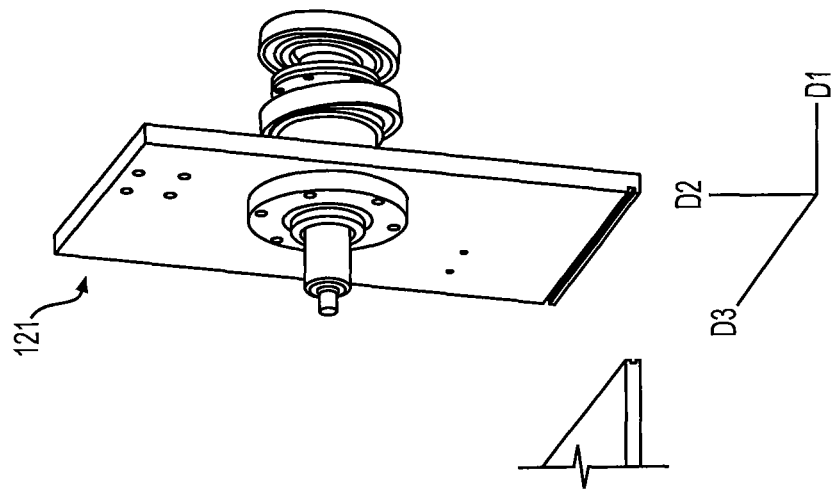

FIGS. 4A, 4B, and 4C are exploded views of an orbital plant material feed assembly according to example embodiments.

Referring to FIGS. 1, 4A, and 4B, a coupling flange 141 of an example embodiment may include a rim 141r, a first rod portion 141P1, and a second rod portion 141P2. The first rod portion 141P1 and the second rod portion 141P2 may be cylindrical in shape and may be connected to each other. A diameter of the second rod portion 141P2 may be less than a diameter of the first rod portion 141P1. The first rod portion 141P1 of the coupling flange 141 may be between the support wall 121 and the second rod portion 141P2 in the first direction D1. The first rod portion 141P1 and the second rod portion 141P2 of the coupling flange 141 may extend in the first direction D1 at least partially over the drum structure 130.

The coupling bracket 142 may include a tubular section 142t that may fit around the second rod portion 142P2 of the coupling flange 141. The coupling bracket 142 may further include a mounting section 142m that connects to the hopper assembly 110 and extends from the tubular section 142t.

Referring FIG. 4A, an inner region of the first ring structure 132, such as the fourth portion 132P4 (see FIG. 3B), may define a first opening O1. An inner region of the second ring structure 136, such as the fourth portion 136P4 (see FIG. 3B), may define a second opening O2. An inner region of the third ring structure 134, such as the fourth region 134R4 (see FIG. 3B), may define a third opening O3. The first opening O1, second opening O2, and third opening O3 may extend in the first direction D1 through the first ring structure 132, second ring structure 136, and third ring structure 134, respectively. The first opening O1 of the first ring structure 132 may be spaced apart in the first direction D1 from the second opening O2 of the second ring structure 136. The third opening O3 of the third ring structure 134 may be between the first opening O1 and the second opening O2 of the first ring structure 132 and the second ring structure 136 in the first direction D1.

Referring to FIGS. 3A, 3B, and 4A to 4C, the shaft structure 162 may extend through the first opening O1 of the first ring structure 132, the second opening O2 of the second ring structure 136, and the third opening O3 of the third ring structure 134. In some example embodiments, an inner surface of the shaft structure 162 may define a cavity C. The cavity C may extend in the first direction D1 through the first opening O1 of the first ring structure 132 and may further extend through the third opening O3 of the third ring structure 134. In some examples, the cavity C may also extend through the second opening O2 of the second ring structure 136. A length of the cavity C in the first direction D1 may be less than a length of the shaft structure 162 in the first direction D1. In some example embodiments, Vacuum and/or gas may be provided through the cavity C of the shaft structure 162.

The vacuum and/or gas may be provided through the cavity C of the shaft structure 162 to the peripheral groove PG, for example through channels (not shown) in the third ring structure 134. The vacuum and/or gas may be used to hold the plant material against the base surface PG_BS (see FIG. 2C) of the peripheral groove PG and/or release the plant material from the base surface PG_BS.

A plurality of spacer structures 168 may surround the shaft structure 162 in some example embodiments. The support wall 121 may define a wall opening 121_0 that is spaced apart in the first direction D1 from the second opening O2 of the second ring structure 136. The first flange 164 may include a first base 164b connected to the third ring structure 134, an end region 164er, and an extending member 164em between the first base 164b and the end region 164er. The second flange 166 may include a base 166_b connected to the support wall 121 around the wall opening 121_0 of the support wall 121, a lip end 166L, and an extending portion 166ep between the lip end 166L and the base 166_b.

The extending member 164_em of the first flange 164 may extend in the first direction D1 from the first base 164b of the first flange 164 through the wall opening 121_0 of the support wall 121. The extending member 164_em of the first flange 164 may surround a middle region of the shaft structure 162. The extending portion 166_ep of the second flange 166 may extend from the base 166_p in the first direction D1 towards first ring structure 132. The lip end 166L of the second flange 166 may be surrounded by the fourth portion 132P4 of the first ring structure 132.

Referring to FIGS. 3A to 3C and 4A, a plurality of spacer structures 168 in some example embodiments may include a first spacer structure 168(1), a second spacer structure 168(2), a third spacer structure 168(3), one or more fourth spacer structures 168(4), and a fifth spacer structure 168(5). The first spacer structure 168(1) may be between the shaft structure 162 and one of the steps of the fourth portion 132P4 of the first ring structure 132. The second spacer structure 168(2) may be between the shaft structure 162 and one of the steps of the fourth portion 136P4 of the second ring structure 136. The third spacer structure 168(3) may be in the third opening O3 of the third ring structure 134 and between the third ring structure 134 and the shaft structure 162. The one or more fourth spacer structures 168(4) may surround the first flange 164 and may be disposed between the extending portion 166ep of the second flange 166 and the extending member 164em of the first flange 164. The fifth spacer structure 168(5) may surround the shaft structure 162 and may be disposed between the shaft structure 162 and the end region 164er of the first flange 164.

The first flange 164 may include a collar 164c and a rim 164R that form the first base 164b of the first flange 164. The rim 164R of the first flange 164 may extend in the first direction D1 into the third opening O3 of the third ring structure 134, surround the third spacer structure 168(3), and fit between the third spacer structure 168(3) and the third ring structure 134. The collar 164c of the first flange 164 may be between the extending member 164em of the first flange 164 and the rim 164R of the first flange 164. A diameter of the collar 164C of the first flange 164 may be greater than a diameter of the rim 164R of the first flange 164.

Referring to FIGS. 3A to 3C, in some example embodiments gasket rings 169 may surround the shaft structure 162. The first spacer structure 168(1) and the second spacer structure 168(2) may be tilted at the first angle θ1 and the second angle θ2, respectively, relative to the plane PL that extends through the first location PG_L1 of the peripheral groove PG and the second location PG_L2 of the peripheral groove PG. In some example embodiments, said angles are the same, and in some example embodiments the angles are different. The third spacer structure 168(3), the one or more four spacer structures 168(4), and the fifth spacer structure 168(5) may be arranged so they are generally parallel to the plane PL that extends through the first location PG_L1 of the peripheral groove PG and the second location PG_L2 of the peripheral groove PG.

In some example embodiments, a plurality of gasket rings 169 may include a first gasket ring 169(1) that fits between the first spacer structure 168(1) and the lip end 166L of the second flange 166. The first gasket ring 169(1) may include a tilted surface 169TS opposite a flat surface 169FS. The tilted surface 169TS of the first gasket ring 169(1) may contact the first spacer structure 168(1). The flat surface 169FS of the first gasket ring 169(1) may contacts the lip end 166L of the second flange 166. In some example embodiments, this may couple non-parallel surfaces of the first spacer structure 168(1) and the lip end 166L of the second flange 166, respectively, to each other.

According to some example embodiments, the shaft structure 162 may include a head portion that extends in the first direction D1 through the second opening O2 of the second ring structure 136. The head portion of the shaft structure 162 may include a plurality of step sections 162_SS. A plurality of gasket rings of some example embodiments 169 may include a second gasket ring 169(2) that fits between a corresponding step section 162_SS in the head portion of the shaft structure 162 and the second spacer structure 168(2). The second gasket ring 169(2) may include a tilted surface 169TS opposite a flat surface 169FS. The tilted surface 169TS of the second gasket ring 169(2) may contact the second spacer structure 168(2). The flat surface 169FS of the second gasket ring 169(2) may contact the corresponding step section 162_SS of the head portion of the shaft structure 162. In some example embodiments, this may couple non-parallel surfaces of the second spacer structure 168(2) and the head portion of the shaft structure 162, respectively, to each other.

Figure 5A:
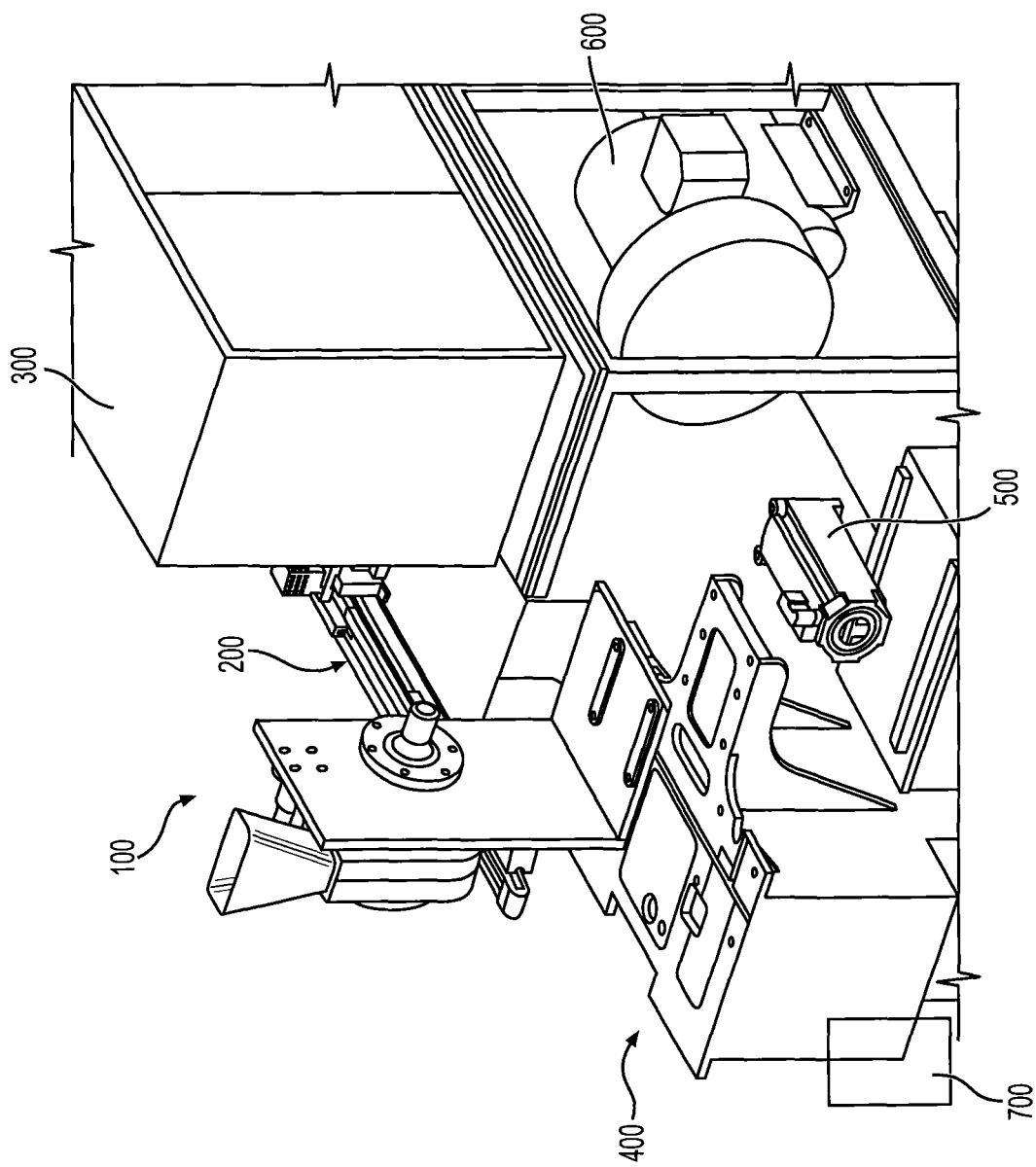
FIGS. 5A and 5B respectively are rear and front perspective views of an orbital plant material feed system according to some example embodiments.
Figure 5B:
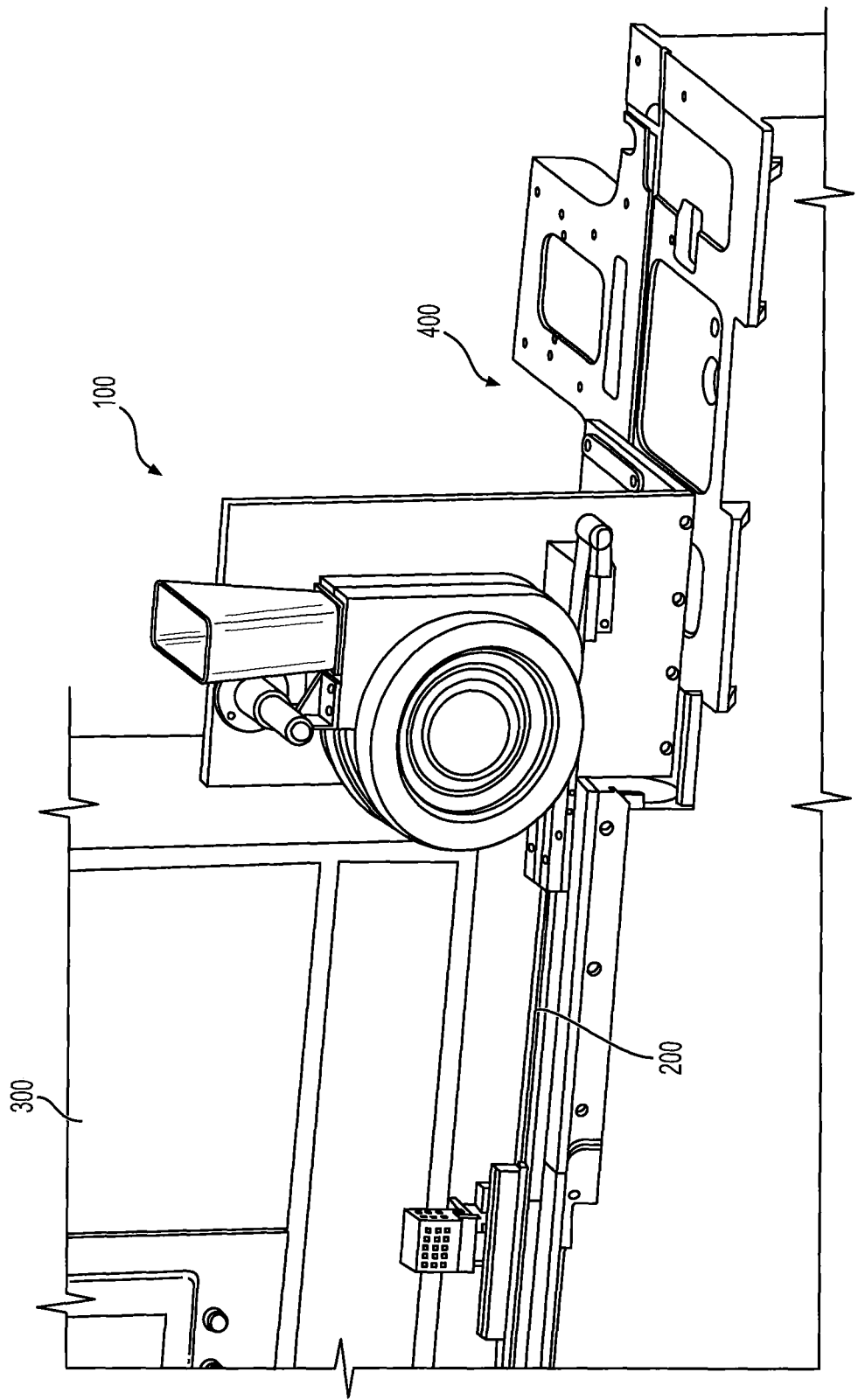

FIGS. 5A and 5B respectively are rear and front perspective views of an orbital plant material feed system according to some example embodiments.

Referring to FIGS. 5A and 5B, a plant material feed system may include an orbital plant material feed assembly 100, a conveyor belt 200 connected to the orbital plant material feed assembly 100, an operation station 300 for controlling the orbital plant material feed assembly 100, a platform 400 for supporting the orbital plant material feed assembly 100, a motor 500 for powering the orbital plant material feed assembly 100, a vacuum and/or gas supply pump 700 for providing vacuum and/or gas to the orbital plant material feed assembly 100, and a power supply 600 for providing electrical power to the orbital plant material feed assembly 100.

Figure 6:
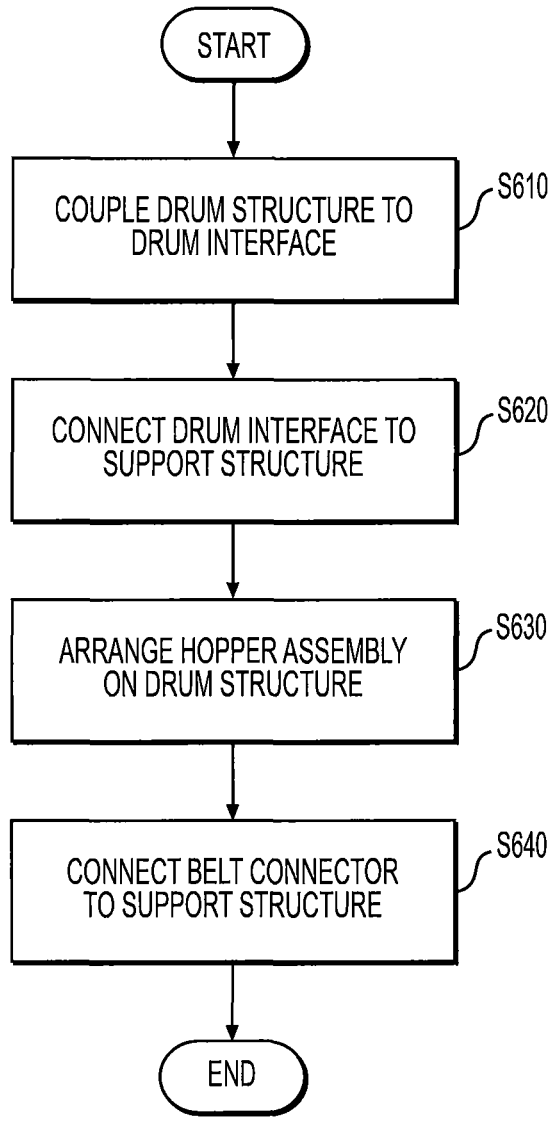
FIG. 6 is a flow chart illustrating a method of making an orbital plant material feed assembly according to some example embodiments.

FIG. 6 is a flow chart illustrating a method of making an orbital plant material feed assembly according to some example embodiments.

In operation 5610 of an example embodiment, a drum structure 130 may be connected to a drum interface. As discussed above with reference to FIGS. 3A to 3C, a drum interface may include a shaft structure 162, first flange 164, second flange 166, spacer structures 168, and gasket rings 169, but is not limited thereto, and may be configured to rotate the drum structure 130 about an axis that runs through the first and second sides of the drum structure 130.

As shown in FIG. 3A, according to an example embodiment, a first flange 164 may be positioned between a shaft structure 162 and a second flange 166 to surround a portion of the shaft structure 162. A second flange 166 may surround portions of the first flange 164 and the shaft structure 162. A desired spacing between the shaft structure 162, first flange 164, and second flange 166 may be achieved by disposing spacer structures 168 between the shaft structure 162, first flange 164, and second flange 166. For example, as shown in FIG. 3A, a fifth spacer structure 168(5) and third spacer structure 168(3) may surround the shaft structure 162 and may be positioned between the shaft structure 162 and the first flange 164 near an end region 164er and first base of the first flange 164. One of more fourth spacer structures 168(4) may surround the first flange 164 and may be positioned between an extending member 164em of the first flange 164 and an extending portion 166ep of the second flange 166.

In an example embodiment, the drum structure 130 may include a first side (e.g., defined by the first ring structure 132), a second side (e.g., defined by the second ring structure 136) spaced apart from the first side in the first direction D1, and a middle portion (e.g., defined by the third ring structure 134) connecting the first side of the drum structure 130 to the second side of the drum structure 130.

In an example embodiment, the drum structure 130 may be coupled to respective portions of the drum interface. For example, as shown in FIGS. 3B and 3C, the first ring structure 132 may be positioned to surround the lip end 166L of the second flange 166, such that the first flange 164 and shaft structure 162 extend through the first ring structure 132 in the first direction D1. A step of the fourth portion 132P4 of the first ring structure 132 may be connected to the lip end 166L using the first spacer structure 168(1) and the first gasket ring 169(1). A flat surface 169FS of the first gasket ring 169(1) may surround the lip end 166L of the second flange 166 and the first spacer structure 168(1) may engage a tilted surface 169TS of the first gasket ring 169(1) and one of the steps in the fourth portion 132P4 of the first ring structure 132.

As shown in FIGS. 3B to 3C, according to some example embodiments, the second ring structure 136 may be positioned around the head of the shaft structure 162 and connected thereto using a second spacer structure 168(2) and a second gasket ring 169(2). A flat surface 169FS of the second gasket ring 169(2) may surround one of the step sections 162_SS and the second spacer structure 168(2) may engage the tilted surface 169TS of the second gasket ring 169(2) and one of the steps in the fourth portion 136P4 of the second ring structure 136. The third ring structure 134 may be positioned around the first flange 164 so a fourth region 134R4 of the third ring structure 134 surrounds at least a portion of the first base 164b of the first flange 164, the third spacer structure 168(3), and a portion of the shaft structure 162. Surfaces of the first region 134R1 and second region 134R2 of the third ring structure 134 may contact respective surfaces of the first portion 132P1 of the first ring structure 132 and the first portion 136P1 of the second ring structure 136. The first portion 132P1 of the first ring structure 132 may surround the at least part of the first region 134R1 of the third ring structure 134. The first portion 136P1 of the second ring structure 136 may surround at least part of the second region 134R2 of the third ring structure 134. Afterwards, the first ring structure 132 and second ring structure 136 may be tilted with respect to opposite sides of the third ring structure 134.

Referring to FIGS. 1 and 6, in operation 5620 of an example embodiment, the drum interface may be connected to the support structure 120. For example, referring to FIGS. 3A to 3C, the shaft structure 162, first flange 164, and second flange 166 may be positioned through the wall opening 121_0 of the support wall 121. The base 166_b of the second flange 166 may be connected to corresponding holes in the support wall 121 through one or more bolts (not shown) or another suitable fastening structure.

During operation 5620, or before or after operation 5620, a support base 122 may be connected to a bottom region of a second surface 121_S2 of the support wall 121 using one or more fasteners (e.g., bolts or another suitable fastening structure).

Referring to FIGS. 1, 2A, 4A to 4C, and 6, in operation 5620 of an example embodiment, the hopper assembly 110 may be connected to the support structure 120. The hopper assembly 110 may be connected to the support wall 121 using the coupling structure 140. The rim 141r of the support structure 140 may be secured to the first surface 121_S1 of the support wall 121 using one or more fasteners (e.g., bolts, not shown). A first rod portion 141P1 and second rod portion 141P2 may extend at least partially over the drum structure 130.

A coupling bracket 142 may be used to connect a coupling flange 141 to the hopper assembly 110. For example, a tubular second 142t may be placed around a second rod portion 141P2 and a mounting section 142m may be fastened (e.g., using bolts, not shown) to a first region of the upper surface of the bottom piece 110bp of the hopper assembly 110. A base 110B of the hopper structure 110H may be secured to a second region of the upper surface of the bottom piece 110bp.

Referring to FIGS. 2A, 2B, and 6, in operation 5630 of an example embodiment, the hopper assembly 110 may be arranged on part of the drum structure 130. For example, by rotating the tubular section 142t of the coupling bracket 142 clockwise, the hopper assembly 110 may be positioned to cover a coverage area CA of the external surface of the middle portion of the drum structure 130 and define a compression space CS between the drum structure 130 and the portion of the hopper assembly 110. As a result, the bottom piece 110bp of the hopper assembly 110 may cover a portion of the peripheral groove PG between a first location PG_L1 and second location PG_L2 of the peripheral groove PG. The bottom piece 110bp may be configured to engage and disengage the drum structure 130, as shown in FIGS. 2A and 2B, based on rotating the tubular section 142t of the coupling bracket 142 clockwise and counterclockwise, respectively.

Referring to FIGS. 1 and 6, in operation 5640 of an example embodiment, a belt connector 150 may be connected to the support structure 120. For example, using one or more fasteners (e.g., bolts, not shown), the mounter 154 (e.g., bracket) may connect rail portion 152 of belt connector 150 to the first surface 121_S1 of the support wall 121.

Although FIG. 6 illustrates an example method of making the orbital plant material feed assembly in FIG. 1, one of ordinary skill in the art would appreciate that the method may be modified in various ways. For example, without limitation, the order of performing operations 5610 to 5640 may change, or some example steps or portions of the examples steps may be omitted.

While some example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

I claim:

1. An orbital plant material feed assembly comprising:
   a drum structure including an external surface having a curved shape,
   the external surface of the drum structure including a peripheral groove,
   a width of the peripheral groove changing from a first value at a first location of the peripheral groove to a second value at a second location of the peripheral groove,
   the first value being greater than the second value; and
   a hopper assembly configured to cover a coverage area of the external surface of the drum structure,
   the hopper assembly being configured to define a compression space between the drum structure and a portion of the hopper assembly that covers a portion of the peripheral groove,
   the compression space including an entrance in fluid communication with an inlet opening of the hopper assembly, wherein
   the first location of the peripheral groove and the second location of the peripheral groove are spaced apart from each other in a circumferential direction at a same radial position along the external surface of the drum structure, and
   the first location of the peripheral groove and the second location of the peripheral groove are greater than 0 degrees apart from each other from a side view of the drum structure and about 180 degrees or less apart from each other from the side view of the drum structure.

2. The orbital plant material feed assembly of claim 1, wherein the portion of the peripheral groove is between the first location of the peripheral groove and the second location of the peripheral groove.

3. The orbital plant material feed assembly of claim 1, wherein the hopper assembly and the drum structure are configured to compress plant material fed into the compression space as the plant material traverses from the inlet opening of the hopper assembly to an outlet of the compression space.

4. The orbital plant material feed assembly of claim 1, wherein the hopper assembly and the drum structure are configured to compress plant material fed into the compression space as the drum structure is rotated about an axis of the drum structure.

5. The orbital plant material feed assembly of claim 1, wherein the portion of the peripheral groove is within the coverage area.

6. The orbital plant material feed assembly of claim 1, further comprising:
   a support structure;
   a coupling structure connecting the hopper assembly to the support structure; and
   a drum interface connecting the drum structure to the support structure.

7. The orbital plant material feed assembly of claim 6, further comprising:
   a belt connector attached to the support structure, wherein the drum structure and the hopper assembly are over the belt connector.

8. The orbital plant material feed assembly of claim 6, wherein the support structure, the drum interface, or both the support structure and the drum interface include steel.

9. The orbital plant material feed assembly of claim 1, wherein
   the drum structure, the hopper assembly, or both the drum structure and the hopper assembly includes steel, poly ether ketone (PEEK), or both steel and PEEK.

10. The orbital plant material feed assembly of claim 1, wherein the drum structure includes a first ring structure and a second ring structure.

11. The orbital plant material feed assembly of claim 10, wherein the first ring structure and the second ring structure are tilted towards opposite sides of a plane that extends through the first location of the peripheral groove and the second location of the peripheral groove.

12. The orbital plant material feed assembly of claim 1, wherein
the peripheral groove includes a first sidewall, a second sidewall, and a base surface between the first sidewall and the second sidewall, and
the peripheral groove extends at least partially around a circumference of the drum structure.

13. The orbital plant material feed assembly of claim 12, the first sidewall of the peripheral groove and the second sidewall of the peripheral groove are tilted at a first angle and a second angle, respectively, towards a plane that extends through the first location of the peripheral groove and the second location of the peripheral groove.

14. The orbital plant material feed assembly of claim 13, wherein the first angle and the second angle are each independently in a range of 3 to 10 degrees.

15. The orbital plant material feed assembly of claim 12, wherein
the drum structure includes a first ring structure, a second ring structure, and a third ring structure between the first ring structure and the second ring structure,
the first ring structure and the second ring structure are tilted towards opposite sides of the third ring structure, and
an outer surface of the third ring structure defines the base surface of the peripheral groove.

16. The orbital plant material feed assembly of claim 15, wherein
a first portion of the first ring structure surrounds at least part of a first region of the third ring structure, contacts the third ring structure, and defines the first sidewall of the peripheral groove,
a first portion of the second ring structure surrounds at least part of a second region of the third ring structure, contacts the third ring structure, and defines the second sidewall of the peripheral groove.

17. The orbital plant material feed assembly of claim 15, wherein
a shape of the first ring structure is the same as a shape of the second ring structure, and
the first ring structure and the second ring structure are symmetric to each other with respect to a plane that extends through the first location of the peripheral groove and the second location of the peripheral groove.

18. The orbital plant material feed assembly of claim 15, further comprising:
a shaft structure coupled to the third ring structure, wherein
the shaft structure is configured to rotate the third ring structure about an axis of the third ring structure.

19. The orbital plant material feed assembly of claim 18, wherein
the first ring structure and the second ring structure are connected to the third ring structure such that the first ring structure and the second ring structure are configured to rotate about the axis of the third ring structure in response to the third ring structure rotating about the axis of the third ring structure.

20. The orbital plant material feed assembly of claim 18, further comprising:
pins coupling the third ring structure to the first ring structure and to the second ring structure.

21. The orbital plant material feed assembly of claim 1, wherein
a depth of the peripheral groove is in a range from about 6 mm to about 12 mm at the first location of the peripheral groove and in a range from about 6 mm to about 12 mm at the second location of the peripheral groove, and
a width of the peripheral groove is in a range from about 16 mm to about 25.4 mm at the first location of the peripheral groove and in a range from about 6 mm to about 12 mm at the second location of the peripheral groove.

22. The orbital plant material feed assembly of claim 1, wherein
an area of the compression space at the entrance of the compression space is in a range from about 96 mm sqr to about 304.8 mm sqr, and
an area of the compression space at an outlet of the compression space is in a range from about 36 mm sqr to about 144 mm sqr.

23. The orbital plant material feed assembly of claim 1, wherein
the hopper assembly includes a hopper structure on a bottom piece,
the inlet opening of the hopper assembly is defined by the hopper structure,
the bottom piece of the hopper assembly is configured to engage and disengage the drum structure to contact and separate from the coverage area of the external surface of the drum structure, and to define the compression space when in contact with the coverage area.

24. The orbital plant material feed assembly of claim 1, further comprising:
a belt, wherein
a part of the belt further defines the compression space between the drum structure and the portion of the hopper assembly that covers the portion of the peripheral groove.

25. A plant material feed system comprising:
the orbital plant material feed assembly of claim 1; and
one of
a conveyor belt connected to the orbital plant material feed assembly,
an operation station for controlling the orbital plant material feed assembly,
a platform for supporting the orbital plant material feed assembly,
a motor for powering the orbital plant material feed assembly,
a vacuum supply pump for providing vacuum to the orbital plant material feed assembly,
a power supply for providing power to the orbital plant material feed assembly, or
a sub-combination thereof, or
a combination thereof.

26. The orbital plant material feed assembly of claim 1, further comprising:
a support structure; and
a drum interface connecting the drum structure to the support structure, wherein the drum structure includes a first side, a second side spaced apart from the first side in a first direction, and a middle portion connecting the first side of the drum structure to the second side of the drum structure, the external surface of the drum structure having the curved shape and including the peripheral groove is an external surface of the middle portion of the drum structure having a curved surface with the peripheral groove, the drum interface is configured to rotate the drum structure about an axis that runs in the first direction through the first side of the drum structure and the second side of the drum structure, the hopper assembly is connected to the support structure, the coverage area of the external surface of the drum structure is along the external surface of the middle portion of the drum structure, the portion of the peripheral groove is between the first location of the peripheral groove and the second location of the peripheral groove.

27. The orbital plant material feed assembly of claim 26, wherein the hopper assembly and the drum structure are configured to compress plant material fed into the compression space as the plant material traverses from the inlet opening of the hopper assembly to an outlet of the compression space and as the drum structure is rotated about the axis of the drum structure.

28. The orbital plant material feed assembly of claim 26, wherein the peripheral groove in the external surface of the middle portion of the drum structure includes a first sidewall, a second sidewall opposite the first sidewall, and a base surface between the first sidewall of the peripheral groove and the second sidewall of the peripheral groove, the first sidewall of the peripheral groove and the second sidewall of the peripheral groove are tilted at a first angle and a second angle, respectively, towards a plane that extends through the first location of the peripheral groove and the second location of the peripheral groove, and the peripheral groove extends at least partially around a circumference of the middle portion of the drum structure.

29. The orbital plant material feed assembly of claim 28, wherein the first angle of the peripheral groove and the second angle of the peripheral groove are each independently in a range of 3 to 10 degrees.

30. The orbital plant material feed assembly of claim 28, wherein the drum structure includes a first ring structure, a second ring structure spaced apart from the first ring structure in a first direction, and a third ring structure between the first ring structure and the second ring structure, the third ring structure is the middle portion of the drum structure, a first portion of the first ring structure surrounds a first region of the third ring structure, contacts the third ring structure, and defines the first sidewall of the peripheral groove, a first portion of the second ring structure surrounds a second region of the third ring structure, contacts the third ring structure, and defines the second sidewall of the peripheral groove, the first ring structure and the second ring structure are tilted towards opposite sides of the third ring structure, and an outer surface of the third ring structure defines the base surface of the peripheral groove.

31. The orbital plant material feed assembly of claim 26, wherein the first location of the peripheral groove is at a first position of the drum structure from the side view of the drum structure, the second location of the peripheral groove is a second position of the drum structure from the side view of the drum structure, and the width of the peripheral groove decreases around the external surface of the middle portion of the drum structure from the first location of the peripheral groove to the second location of the peripheral groove.

32. The orbital plant material feed assembly of claim 26, wherein the drum interface includes a shaft structure that extends in the first direction through the first side of the drum structure and the second side of the drum structure, and the shaft structure is coupled to the middle portion of the drum structure.

33. A method of manufacturing an orbital plant material feed assembly, comprising:

connecting a drum structure to a support structure using a drum interface, the drum structure including a first side, a second side spaced apart from the first side in a first direction, and a middle portion connecting the first side of the drum structure to the second side of the drum structure, an external surface of the middle portion of the drum structure having a curved surface with a peripheral groove, a width of the peripheral groove changing from a first value at a first location of the peripheral groove to a second value at a second location of the peripheral groove, the first location and the second location being different from each other, the drum interface being configured to rotate the drum structure about an axis that runs in the first direction through the first side of the drum structure and the second side of the drum structure; and connecting a hopper assembly to the support structure, the hopper assembly being configured to cover a coverage area of the external surface of the middle portion of the drum structure, the hopper assembly being configured to define a compression space between the drum structure and a portion of the hopper assembly that covers a portion of the peripheral groove between the first location of the peripheral groove and the second location of the peripheral groove, the compression space including an entrance in fluid communication with an inlet opening of the hopper assembly, wherein the first location of the peripheral groove and the second location of the peripheral groove are spaced apart from each other in a circumferential direction at a same radial position along the external surface of the drum structure, and the first location of the peripheral groove and the second location of the peripheral groove are greater than 0 degrees apart from each other from a side view of the drum structure and about 180 degrees or less apart from each other from the side view of the drum structure.

34. The method of claim 33, wherein
the first location of the peripheral groove is at a first position of the drum structure from the side view,
the second location of the peripheral groove is a second position of the drum structure from the side view, and
the width of the peripheral groove decreases around the external surface of the middle portion of the drum structure from the first location of the peripheral groove to the second location of the peripheral groove.

* * * * *